(12) United States Patent
Wilson et al.

(10) Patent No.: US 9,132,704 B2
(45) Date of Patent: Sep. 15, 2015

(54) CONSTANT PRESSURE PNEUMATIC BALANCING TIRE INFLATION SYSTEM

(75) Inventors: Matt J. Wilson, Canal Fulton, OH (US); Jesse W. Cervantez, Navarre, OH (US); Santo Padula, Medina, OH (US); Jeffrey S. Morris, Stow, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 546 days.

(21) Appl. No.: 13/194,617

(22) Filed: Jul. 29, 2011

(65) Prior Publication Data
US 2012/0024445 A1    Feb. 2, 2012

Related U.S. Application Data

(60) Provisional application No. 61/369,163, filed on Jul. 30, 2010.

(51) Int. Cl.
*B60C 23/00*    (2006.01)

(52) U.S. Cl.
CPC ............. *B60C 23/003* (2013.01); *B60C 23/007* (2013.01)

(58) Field of Classification Search
CPC .... B60C 23/001; B60C 23/003; B60C 23/007
USPC ................. 152/415, 416, 417, 418; 301/108.1
See application file for complete search history.

(56) References Cited

U.S. PATENT DOCUMENTS

| | | | | |
|---|---|---|---|---|
| 2,693,841 A | * | 11/1954 | Webster, Jr. ................. | 152/417 |
| 3,276,503 A | * | 10/1966 | Kilmarx ........................ | 152/417 |
| 3,760,859 A | * | 9/1973 | Shahan et al. ................ | 152/427 |
| 3,911,988 A | * | 10/1975 | Richards ....................... | 152/427 |
| 4,203,467 A | * | 5/1980 | Cardi ............................ | 137/557 |
| 4,387,931 A | * | 6/1983 | Bland ............................ | 303/1 |
| 4,418,737 A | | 12/1983 | Goodell et al. | |
| 4,431,043 A | | 2/1984 | Goodell et al. | |
| 4,470,506 A | | 9/1984 | Goodell et al. | |
| 4,678,017 A | | 7/1987 | Schultz | |
| 4,724,879 A | | 2/1988 | Schultz et al. | |
| 4,754,792 A | | 7/1988 | Braun et al. | |
| 5,253,687 A | * | 10/1993 | Beverly et al. ................ | 152/416 |
| 5,287,906 A | * | 2/1994 | Stech ............................ | 152/417 |

(Continued)

FOREIGN PATENT DOCUMENTS

WO    2009047765 A2    4/2009

*Primary Examiner* — Kip T Kotter
*Assistant Examiner* — Jean Charleston
(74) *Attorney, Agent, or Firm* — Dureska, Kennedy & Moore, L.L.C.; David P. Dureska; Edward T. Kennedy

(57) ABSTRACT

A constant pressure vehicle tire inflation system includes an air supply source. A first wheel valve is in fluid communication with a first tire of the vehicle, and a second wheel valve is in fluid communication with a second tire of the vehicle. A pneumatic conduit extends between and is in fluid communication with the air supply source and the wheel valves. At least a portion of the pneumatic conduit remains charged with air from at least one of the supply source and the tires. The system includes means for distributing air flow between the pneumatic conduit and the first and second wheel valves, in which the wheel valves and the means selectively maintain fluid communication between the first and second tires and the pneumatic conduit to provide pneumatic balancing between the tires, and the wheel valves provide emergency protection when a tire experiences significant pressure loss.

26 Claims, 16 Drawing Sheets

(56) References Cited

U.S. PATENT DOCUMENTS

| | | | |
|---|---|---|---|
| 5,769,979 A | 6/1998 | Naedler | |
| 5,807,445 A * | 9/1998 | Hoffmann | 152/415 |
| 6,145,559 A * | 11/2000 | Ingram, II | 152/417 |
| 6,244,316 B1 | 6/2001 | Naedler | |
| 6,269,691 B1 * | 8/2001 | Sowatzke et al. | 73/146.2 |
| 6,325,123 B1 | 12/2001 | Gao et al. | |
| 6,425,427 B1 | 7/2002 | Stech | |
| 6,457,502 B1 | 10/2002 | Bell et al. | |
| 6,666,078 B1 | 12/2003 | Claussen et al. | |
| 7,207,365 B2 * | 4/2007 | Nelson et al. | 152/417 |
| 7,273,082 B2 | 9/2007 | White et al. | |
| 7,418,989 B2 * | 9/2008 | Ingram | 152/417 |
| 7,437,920 B2 | 10/2008 | Beverly et al. | |
| 7,882,731 B1 * | 2/2011 | Franks et al. | 152/417 |
| 8,505,600 B2 | 8/2013 | Padula et al. | |
| 2006/0180256 A1 | 8/2006 | Mittal | |
| 2009/0084481 A1 | 4/2009 | Kalavitz | |
| 2009/0283190 A1 * | 11/2009 | Padula et al. | 152/417 |
| 2010/0078109 A1 | 4/2010 | Wilson et al. | |
| 2012/0059546 A1 | 3/2012 | Wilson et al. | |

* cited by examiner

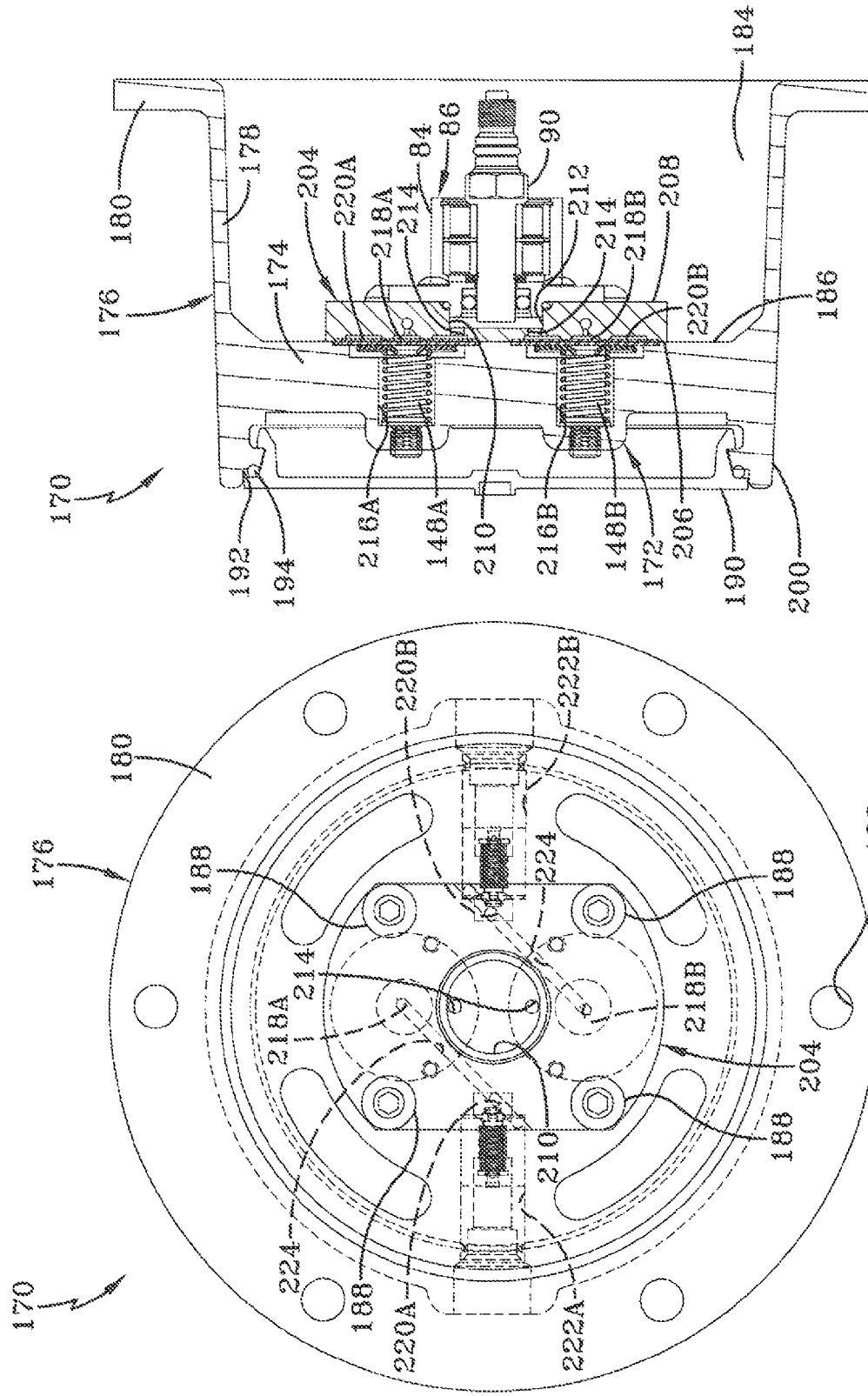

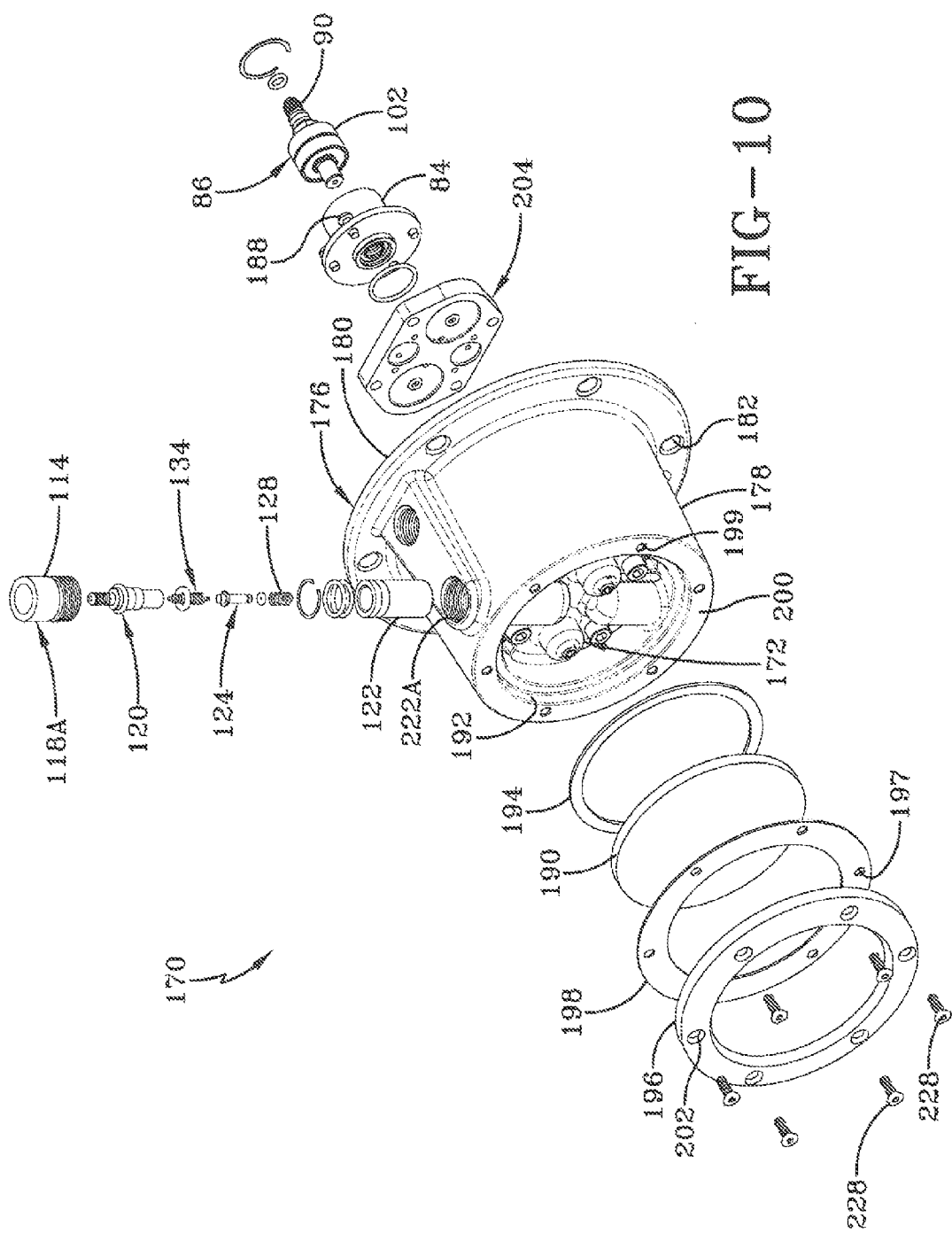

CONSTANT PRESSURE PNEUMATIC BALANCING TIRE INFLATION SYSTEM

CROSS-REFERENCE TO RELATED APPLICATIONS

This application claims the benefit of U.S. Provisional Patent Application Ser. No. 61/369,163, which was filed on Jul. 30, 2010.

BACKGROUND OF THE INVENTION

1. Technical Field

The invention relates to the art of tire inflation systems. More particularly, the invention relates to tire inflation systems for heavy-duty vehicles such as trucks and tractor-trailers or semi-trailers, which can operate as the vehicle is moving. Still more particularly, the invention is directed to a tire inflation system that is a constant pressure system which continuously balances pneumatic pressure across all of the tires in the system, and provides emergency protection in the event a tire in the system experiences significant pressure loss.

2. Background Art

Heavy-duty vehicles typically include trucks and tractor-trailers or semi-trailers. Tractor-trailers and semi-trailers, which shall collectively be referred to as tractor-trailers for the purpose of convenience, include at least one trailer, and sometimes two or three trailers, all of which are pulled by a single tractor. All heavy-duty vehicles that are trucks or tractor-trailers include multiple tires, each of which is inflated with a fluid or gas, such as air, to an optimum or recommended pressure. This optimum or recommended tire pressure typically is referred to in the art as the target inflation pressure or the target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Should an air check show that a tire is under-inflated, it is desirable to enable air to flow into the tire to return it to the target pressure. Likewise, it is well known that the air pressure in a tire may increase due to increases in ambient air temperature, so that it is also necessary to regularly check the air pressure in each tire to ensure that the tires are not greatly above the target pressure and thus over-inflated. Should an air check show that a tire is over-inflated, it is desirable to enable air to flow out of the tire to return it to the target pressure.

The large number of tires on any given heavy-duty vehicle setup makes it impractical to manually check and maintain the target pressure for each and every tire. This difficulty is compounded by the fact that trailers of tractor-trailers or trucks in a fleet may be located at a site for an extended period of time, during which the tire pressure might not be checked. Any one of these trailers or trucks might be placed into service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure.

Moreover, should a tire encounter a condition as the vehicle travels over-the-road that causes the tire to become under-inflated, such as developing a leak from striking a road hazard, the life and/or performance of the tire may be significantly reduced if the under-inflation continues unabated as the vehicle continues to travel. Likewise, should a tire encounter a condition that causes it to become significantly over-inflated, such as increasing pressure from an increased ambient air temperature, the life and/or performance of the tire may be significantly reduced if the over-inflation continues unabated as the vehicle continues to travel. The potential for significantly reduced tire life typically increases in vehicles such as trucks or tractor-trailers that travel for long distances and/or extended periods of time under such less-than-optimum inflation conditions.

Such a need to maintain the target pressure in each tire, and the inconvenience to the vehicle operator having to manually check and maintain a proper tire pressure that is at or near the target pressure, led to the development of prior art tire inflation systems. In these prior art systems, an operator selects a target inflation pressure for the vehicle tires. The system then monitors the pressure in each tire and attempts to maintain the air pressure in each tire at or near the target pressure by inflating the tire when the monitored pressure drops below the target pressure. These prior art tire inflation systems inflate the tires by providing air from the air supply of the vehicle to the tires by using a variety of different components, arrangements, and/or methods. Certain prior art systems are also capable of deflation, and these systems deflate the tires when the monitored pressure rises above the target pressure by venting air from the tires to atmosphere.

While being satisfactory for their intended functions, tire inflation systems of the prior art may experience disadvantages in certain situations. For example, a first disadvantage in the prior art is that many prior art tire inflation systems are not capable of deflation. As a result, when the air pressure in a tire increases to a level that is greatly above the target pressure, typically due to increases in ambient air temperature, these systems are unable to reduce the pressure in the tires. As a result, such prior art tire inflation systems may allow the tires to operate in a significantly over-inflated condition, which undesirably decreases performance of the tires and in turn decreases the life of the tires.

A second disadvantage occurs in prior art tire inflation systems that are capable of deflation. More particularly, deflation-capable systems typically are electronically controlled, employing electronically-operated solenoid valves, electronic controllers, and other electronic components, which are expensive and are often complex to install and configure. In addition, these electrical components require the use of the electrical system of the vehicle, which may be unreliable or even non-functional at times, in turn rendering the operation of the tire inflation system unreliable and potentially non-functional. As a result, prior art deflation-capable tire inflation systems which are electronically controlled are often undesirably expensive, complex, and potentially undependable.

A third disadvantage is that most prior art tire inflation systems which are capable of deflation, and particularly electronically-controlled systems, are not constant-pressure systems and thus do not actively monitor tire pressure. More particularly, in the prior art, the principal goal of most deflation-capable tire inflation systems has been to respond to operator-controlled adjustments of the target inflation pressure, rather than to actively monitor tire pressure and continuously maintain the target inflation pressure. As a result, in most deflation-capable prior art tire inflation systems, when the system is not performing inflation or deflation, the pneumatic conduit of the system is exhausted to atmosphere.

In such a system, without air pressure in the pneumatic conduit, electronic controls are employed to periodically check tire pressure, and to in turn trigger or commence inflation or deflation, as may be required. Because such prior art systems are capable of only providing a periodic check of tire pressure, any inflation or deflation to bring the tires to the target pressure only takes place following the periodic check. This lack of ability of prior art systems to continuously monitor tire pressure and dynamically respond to pressure changes undesirably reduces the ability of the system to actively or quickly respond to reduced tire pressure conditions, such as in the case of an air leak, and to increased tire pressure conditions, such as an increase in ambient temperature. Moreover, as mentioned above, the electronic controls employed by prior art tire inflation systems are expensive, complex, and require power from the electrical system of the vehicle, which may be unreliable.

A fourth disadvantage of prior art tire inflation systems is that most systems, and particularly those prior art systems which are constant-pressure systems, do not provide balancing of pneumatic pressure across all of the tires in the system. More particularly, as described above, a typical heavy-duty vehicle includes multiple tires, and each one of those tires is operatively and independently connected to a single tire inflation system. More specifically, most prior art tire inflation systems are connected directly to each tire, and of these, many include a one-way check valve for each tire that prevents air from exiting the tire. In such a configuration, the tire inflation system monitors the pressure in each tire, inflating any tire that falls below the target pressure. While such separate inflation of each tire is satisfactory for its intended purpose, such prior art systems are not capable of deflation of the tires, and thus are unable to reduce the pressure in the tires when it increases to a level that is greatly above the target pressure.

In addition, such prior art systems lack fluid communication between the tires. Without fluid communication between the tires, different tires may be inflated to slightly different pressure levels, which is undesirable. More particularly, many heavy-duty vehicles include a dual-wheel or dual-tire configuration, in which two tires are mounted on a single wheel end assembly. Because the two tires are mechanically connected to each other through their respective mounting on the same wheel end assembly, they rotate at the same speed during vehicle operation. Although both wheels are designed to be the same diameter, their actual respective diameters are slightly different, since the lack of fluid communication between them causes them to be inflated to slightly different pressure levels. The difference in actual respective diameters between the tires, while they rotate at the same speed, causes one of the tires to experience dragging, which is also referred to in the art as scrubbing. Scrubbing of a tire causes premature wear on that tire, and undesirably shortens the life of the tire.

In addition, the lack of fluid communication between the tires undesirably increases the chance that a tire may operate with an excessively low inflation pressure. For example, in the event that one tire in the system is about fifty percent (50%) below the target inflation pressure, a prior art system may take a significant amount of time to bring the pressure in the low tire up to the target pressure. During that time, it is possible for the tire to be operated in a significantly under-inflated state, which decreases its life. In contrast, when there is fluid communication between the tires, each of the remaining tires in the system passes air to the tire that is below the target inflation pressure. Because multiple tires, such as seven or more tires, each pass a relatively small amount of air to the low-pressure tire, the low pressure tire receives air much more quickly, and all of the tires in the system balance at a pressure that is only slightly below the target pressure, such as about five percent (5%) below the target pressure. In the art, it is more desirable to operate the vehicle with multiple tires that are slightly below the target pressure until the system is able to bring them up to the target pressure, rather than operating the vehicle with a single tire that is significantly below the target pressure.

A fifth disadvantage of prior art tire inflation systems occurs in the few prior art systems which do provide balancing of pneumatic pressure across all of the tires. More specifically, in prior art tire inflation systems that do provide balancing of pneumatic pressure, all of the tires are in fluid communication with one another, and the tires thus have a generally uniform, or balanced, inflation pressure. However, these systems do not provide emergency protection of the tires in the event that one tire experiences a significant pressure loss. For example, if a specific tire is punctured or a pneumatic conduit at the tire ruptures, it is important to pneumatically isolate the system from that tire due to the fluid communication between the tires. In such a system, if the system is not isolated from a tire that is experiencing a significant pressure loss, the uniform inflation pressure of all of the tires may decrease significantly, which may place an excessive inflation demand on the system. The system may not be able to meet this demand, which may result in the tires being operated below the target inflation pressure, in turn reducing tire life, and/or the system may actuate excessively to attempt to meet the demand, thereby reducing the life of the system.

As a result, there is a need in the art for a tire inflation system that overcomes the disadvantages of the prior art by providing a constant-pressure tire inflation system that is capable of deflation, is not electronically controlled, balances pneumatic pressure across all of the tires in the system, and includes emergency protection of the tires in the event that one or more tires experiences a significant pressure loss. The constant pressure pneumatic balancing tire inflation system of the present invention satisfies this need, as will be described in detail below.

BRIEF SUMMARY OF THE INVENTION

An objective of the present invention is to provide a tire inflation system that is a constant-pressure tire inflation system that is capable of deflation.

Another objective of the present invention is to provide a tire inflation system that does not employ electronic components for control.

Yet another objective of the present invention is to provide a tire inflation system that enables balancing of pneumatic pressure across all of the tires in the system.

Still another objective of the present invention is to provide a tire inflation system that includes emergency protection of the tires in the event that one or more tires experiences a significant pressure loss.

These objectives and others are obtained by the constant pressure pneumatic balancing tire inflation system of the present invention. By way of example, a constant pressure vehicle tire inflation system includes an air supply source. A first wheel valve is in fluid communication with a first tire of the vehicle, and a second wheel valve is in fluid communication with a second tire of the vehicle. A pneumatic conduit extends between and is in fluid communication with the air supply source and the wheel valves. At least a portion of the pneumatic conduit remains charged with air from at least one of the supply source and the tires. The system includes means for distributing air flow between the pneumatic conduit and the first and second wheel valves, in which the wheel valves and the means selectively maintain fluid communication between the first and second tires and the pneumatic conduit to provide pneumatic balancing between the tires.

BRIEF DESCRIPTION OF THE SEVERAL VIEWS OF THE DRAWINGS

The preferred embodiments of the present invention, illustrative of the best mode in which Applicants have contemplated applying the principles, are set forth in the following description and are shown in the drawings, and are particularly and distinctly pointed out and set forth in the appended claims.

FIG. 8 is an inboard elevational view of components of the second exemplary embodiment constant pressure pneumatic balancing tire inflation system of the present invention shown in FIG. 7, with hidden portions represented by dashed lines;

FIG. 9 is a cross-sectional elevational view of components of the second exemplary embodiment constant pressure pneumatic balancing tire inflation system of the present invention shown in FIG. 7;

FIG. 10 is an exploded perspective view of the components of the second exemplary embodiment constant pressure pneumatic balancing tire inflation system of the present invention shown in FIG. 7;

Similar numerals refer to similar parts throughout the drawings.

DETAILED DESCRIPTION OF THE INVENTION

Figure 1:
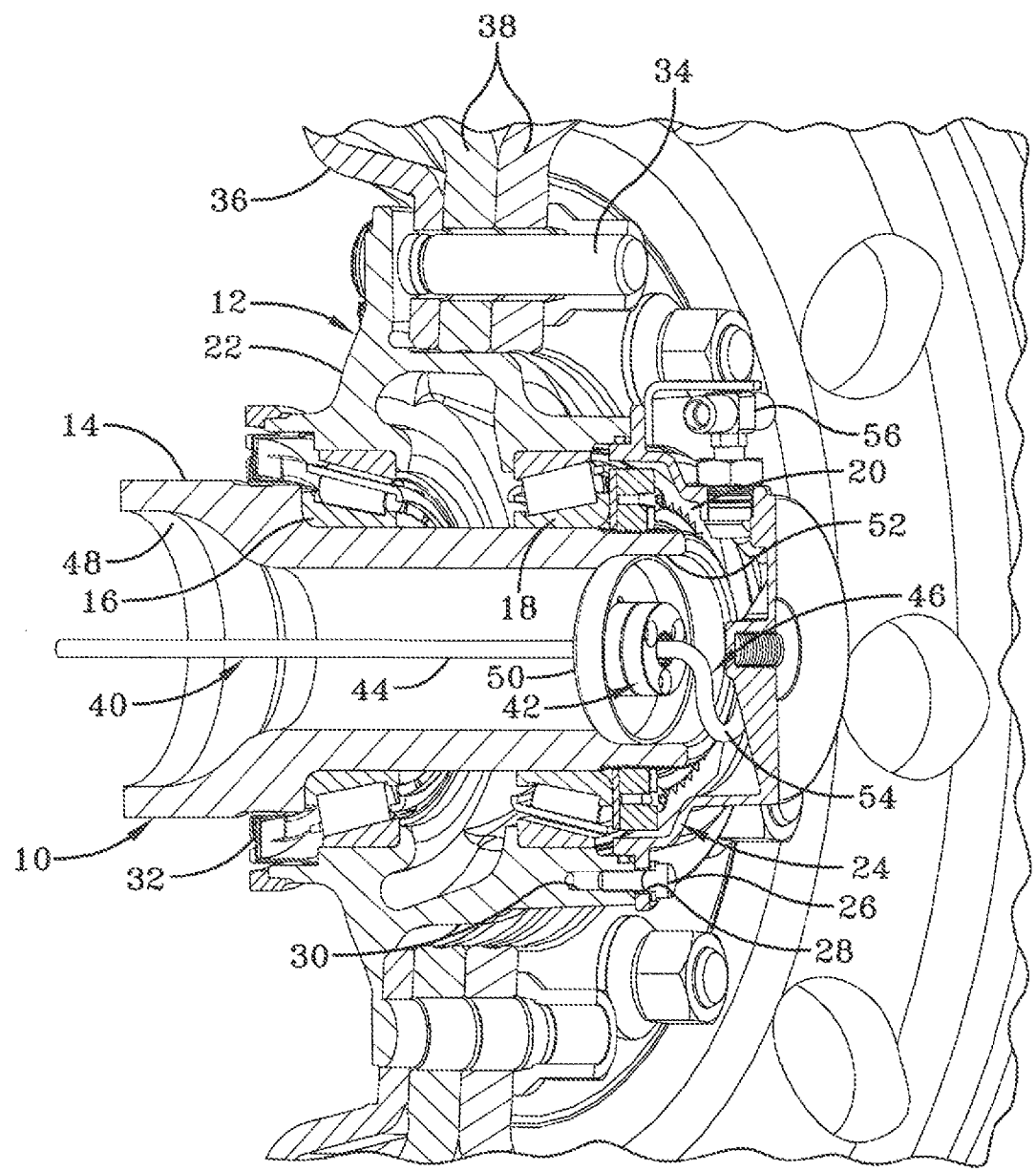
FIG. 1 is a fragmentary cross-sectional perspective view of a portion of an axle spindle and a wheel end assembly, having certain components of a tire inflation system of the prior art mounted thereon, and a brake drum and tire rims mounted on the hub of the wheel end assembly.

In order to better understand the constant pressure pneumatic balancing tire inflation system of the present invention and the environment in which it operates, the components of an exemplary prior art tire inflation system, and the vehicle structures upon which they are mounted are shown in FIG. 1, and now will be described.

One or more axles 10 typically depend from and extend transversely across a heavy-duty vehicle (not shown). Each axle 10 has two ends, with a wheel end assembly 12 mounted on each one of the ends. For the purposes of convenience and clarity, only one end of axle 10 and its respective wheel end assembly 12 will be described herein. In addition, axle 10 is shown by way of example in FIG. 1 as a non-drive axle, with the understanding that the present invention applies to all types of axles known in the art, including drive axles and non-drive axles. Moreover, heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof.

Axle 10 includes a central tube (not shown), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration, a plurality of threaded bolts 34 are used to mount a brake drum 36 and a pair of tire rims 38 on wheel end assembly 12. Each one of a pair of tires (not shown) is mounted on a respective one of tire rims 38, as known in the art.

A prior art tire inflation system is indicated generally at 40. A central bore 48 is formed in axle 10, through which a pneumatic conduit 44 of tire inflation system 40 extends toward an outboard end of axle spindle 14. Pneumatic conduit 44 is fluidly connected to and extends between the vehicle air supply, such as an air tank (not shown), and a rotary union 42. Rotary union 42 is attached to a plug 50 that is press-fit in a machined counterbore 52 formed in axle central bore 48 at an outboard end of axle spindle 14, and as known in the art, facilitates the connection of static pneumatic conduit 44 to an air tube assembly 46, which rotates with the tire.

Air tube assembly 46 includes a first tube 54 that is fluidly connected at one of its ends to rotary union 42 inside hub cap 24, and is fluidly connected at the other of its ends to a tee fitting 56, which passes through the hub cap and is secured to the hub cap. Additional air tubes (not shown) are fluidly connected to and extend from each one of two outlets of tee fitting 56 outside of hub cap 24 to each one of a respective pair of tires mounted on rims 38. In this manner, air passes from the vehicle air tank, through pneumatic conduit 44, rotary union 42, first air tube 54, hub cap 24 and tee fitting 56, and to the tires.

Prior art tire inflation system 40, while being satisfactory for its intended function, includes certain disadvantages. For example, many prior art tire inflation systems 40 are not capable of deflation, and may thus allow the tires to operate in a significantly over-inflated condition, which undesirably decreases performance of the tires and in turn decreases the life of the tires. In addition, in those prior art tire inflation systems 40 that are capable of deflation, electronic control is often used, employing undesirably expensive and complex electronically-operated components, which may also be unreliable due to dependence on the electrical system of the vehicle. Moreover, many prior art tire inflation systems 40 that are capable of deflation are not constant-pressure systems, thereby again requiring undesirably expensive, complex and potentially unreliable electronically-operated components, and lack the ability to continuously monitor tire pressure and quickly respond to pressure changes.

In addition, most prior art tire inflation systems 40 do not provide balancing of pneumatic pressure across all of the tires in the system, which prevents deflation of the tires, and which may allow the tires to undesirably operate in a significantly over-inflated condition. In addition, a lack of balancing of pneumatic pressure prevents fluid communication between the tires, which may lead to scrubbing and premature wear of a tire in a dual-wheel configuration, and also undesirably increases the chance that a tire may operate with an excessively low inflation pressure. In those prior art tire inflation systems 40 that do provide balancing of pneumatic pressure across all of the tires, there is no emergency protection provided for the tires in the event that one or more tires experiences a significant pressure loss, which may place an excessive inflation demand on the system, resulting in the tires being operated below the target inflation pressure and thus reducing tire life, and/or the life of the system may be reduced by actuating excessively in an attempt to compensate for the pressure loss. The constant pressure pneumatic balancing tire inflation system of the present invention overcomes these disadvantages, as will now be described.

The present invention is directed to a tire inflation system that is a pneumatically-controlled, constant-pressure system which is capable of deflation, continuously balances pneumatic pressure across all of the tires in the system, and provides emergency protection in the event a tire in the system experiences significant pressure loss. Specific inventive components are employed to achieve a constant pressure, continuously balancing system. These components preferably include: a hub cap that acts as a manifold, in which the hub cap includes a modular construction; a wheel valve that is integrated into the hub cap, in which the wheel valve includes a certain construction for control of a dual-wheel configuration of a heavy-duty vehicle, and that enables the wheel valve to be mounted on the outside of the hub cap, inside the hub cap, or integrated into the outboard wall of the hub cap; and an optional non-axial tire hose fitting for the system.

It is to be understood that reference herein to a constant pressure tire inflation system includes all tire inflation systems with regulated pressure. For example, constant pressure systems include systems in which all or a significant portion of the pneumatic conduit of the system remains pressurized or charged with compressed air when the system is not engaged in inflation or deflation, and systems in which such pressurization of the pneumatic conduit may be interrupted by a switch or other component.

Figure 2:
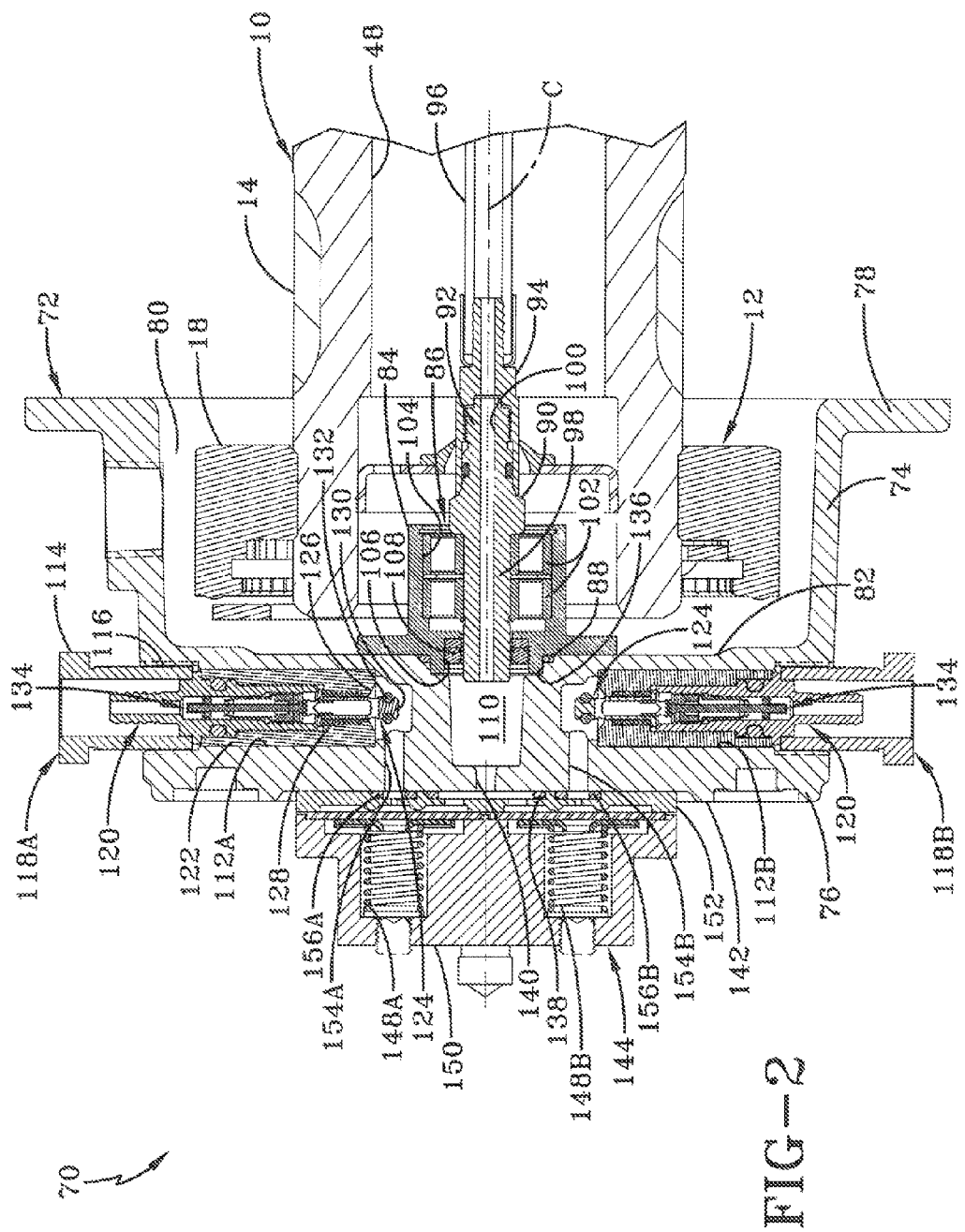
FIG. 2 is a fragmentary cross-sectional elevational view of components of a first exemplary embodiment constant pressure pneumatic balancing tire inflation system of the present invention, shown incorporated into an axle spindle.
Figure 3A:
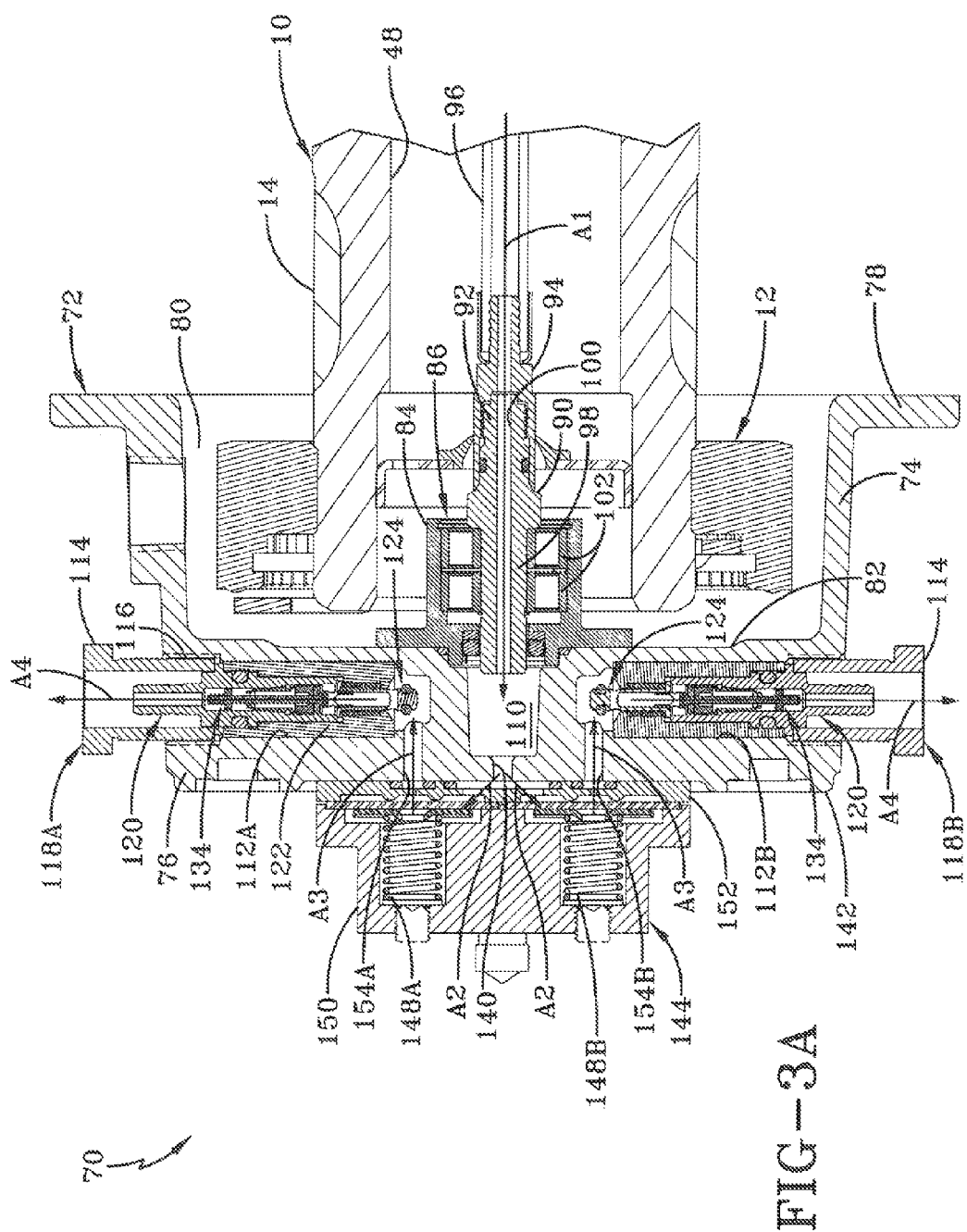
FIG. 3A is the view of first exemplary embodiment constant pressure pneumatic balancing tire inflation system shown in FIG. 2, with pneumatic flow arrows added to indicate an inflation mode.
Figure 3B:
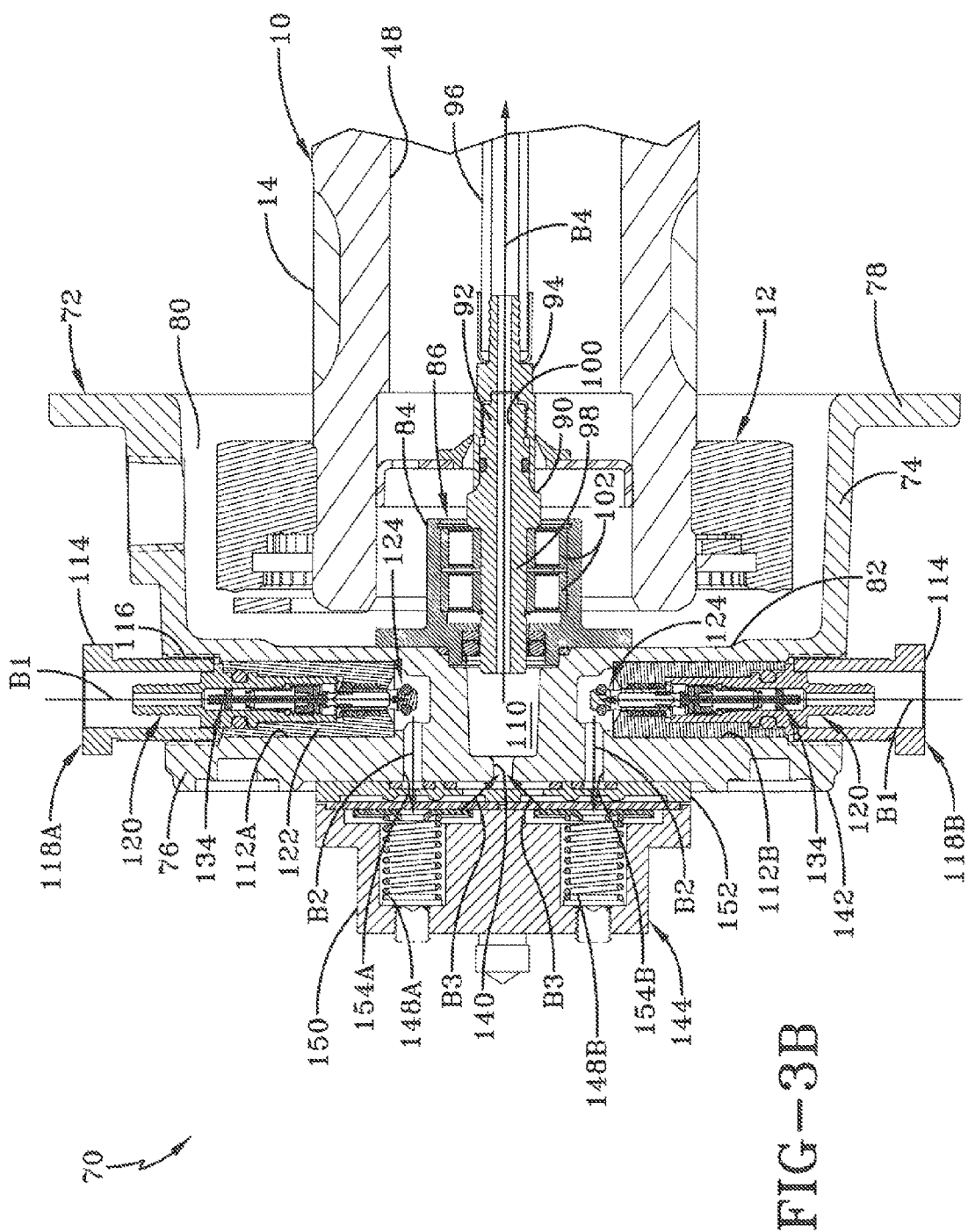
FIG. 3B is the view of first exemplary embodiment constant pressure pneumatic balancing tire inflation system shown in FIG. 2, with pneumatic flow arrows added to indicate a deflation mode.
Figure 4:
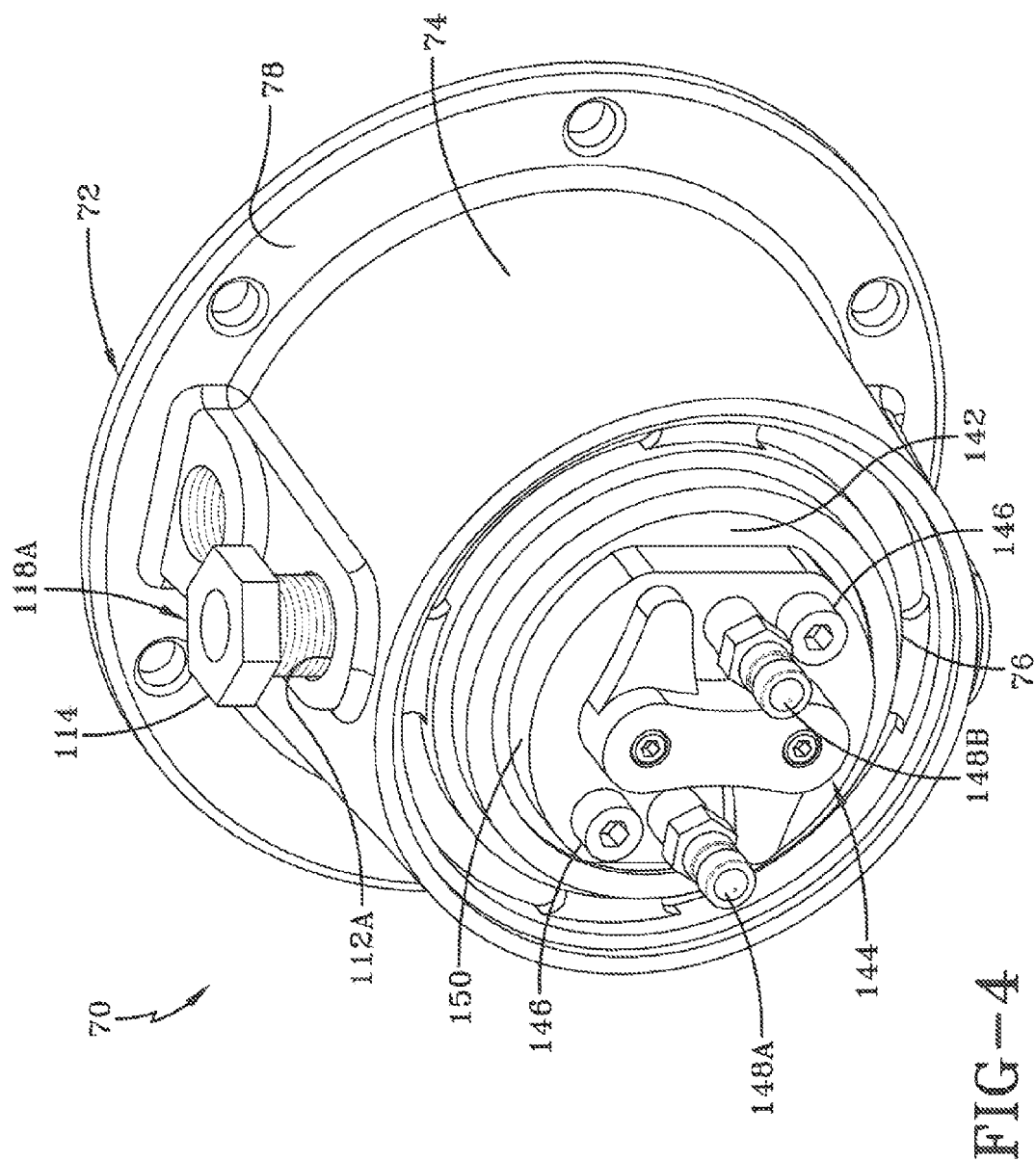
FIG. 4 is an outboard perspective view of the hub cap and dual wheel valve of the first exemplary embodiment constant pressure pneumatic balancing tire inflation system of the present invention shown in FIG. 2.

Turning now to FIGS. 2-4, a first exemplary embodiment of a constant pressure pneumatic balancing tire inflation system of the present invention is indicated generally at 70. It is to be understood that tire inflation system 70 includes an air source, such as an air tank (not shown), which is in fluid communication with the vehicle tires (not shown) via a pneumatic conduit 96 and other components, which will be described in detail below. It is also to be understood that means known to those skilled in the art, such as mechanically-operated regulator valves (not shown), are fluidly connected to pneumatic conduit 96 and are employed to monitor the pneumatic pressure in the tires and to actuate inflation and/or deflation of the tires.

First exemplary embodiment tire inflation system 70 includes a hub cap 72, which in turn includes a cylindrical side wall 74, and an outboard wall 76 integrally formed with the outboard end of the side wall and extending generally perpendicular to the side wall. It is to be understood that other shapes and configurations of hub cap side wall 74 and outboard wall 76 may be employed without affecting the overall concept or operation of the present invention, such as an integrated dome or cone shape formed as one piece or multiple pieces. A radially-extending flange 78 is formed on the inboard end of side wall 74, and is formed with a plurality of bolt openings (not shown) to enable bolts to secure hub cap 72 to the outboard end of wheel hub 22 (FIG. 1). In this manner, hub cap 72 defines an interior compartment 80. It is to be understood that means known to those skilled in the art other than bolts may be used to secure hub cap 72 to wheel hub 22, such as a threaded connection between the hub cap and wheel hub, other types of mechanical fasteners, and/or a press fit.

Hub cap outboard wall 76 includes an inboard surface 82. Bolts (not shown) or other fastening means, including mechanical fasteners and joining techniques, such as welding, adhesives, and the like, are used to secure a cylindrical housing 84 of a rotary union 86 to a recess 136 formed in inboard surface 82 of hub cap outboard wall 76. A gasket 88 is disposed between rotary union housing 84 and inboard surface 82 of hub cap outboard wall 76 to provide a seal between the rotary union housing and the inboard surface of the hub cap outboard wall. Rotary union 86 further includes a stem 90, which in turn includes a threaded inboard portion 92 that engages a female hose connector 94 of tire inflation system pneumatic conduit 96 by any threaded or non-threaded known pneumatic connection means, including threads, push-to-connect fittings, tube fittings, crimped fittings, friction fittings, hose clamps, and the like. Rotary union stem 90 further includes an outboard portion 98 that is rotatably mounted in rotary union housing 84.

To facilitate the rotatable mounting of outboard portion 98 of stem 90 in rotary union housing 84, each one of a pair of bearings 102 is pressed onto the rotary union stem outboard portion, and the outboard portion of the stem, with the bearings, is pressed into a mounting cavity 104 formed in rotary union housing 84. Bearings 102 thus enable hub cap 72 and rotary union housing 84 to rotate about rotary union stem 90, which remains static. To provide an additional seal between rotary union stem outboard portion 98 and rotary union housing 84, an outboard groove 106 is formed in the housing, and a rotary seal 108 is disposed in the groove on the outboard end of rotary union stem 90. Rotary union stem 90 is formed with a central bore 100, which facilitates the passage of air through rotary union 86. Because tire inflation system pneumatic conduit 96 is fluidly connected to an air supply of the vehicle (not shown), air flows from the vehicle air supply, through pneumatic conduit 96, through central bore 100 of rotary union stem 90, and into a supply cavity 110 formed in hub cap outboard wall 76, as indicated by arrow A1 (FIG. 3A).

Supply cavity 110 is formed in axial alignment with an axial centerline C of axle 12 and wheel end assembly 12 (FIG. 2). A center port 140 formed in hub cap outboard wall 76 is in fluid communication with and extends longitudinally along axial centerline C from supply cavity 110 to an outboard surface 142 of the hub cap outboard wall. A wheel valve assembly 144, shown by way of example as a dual wheel valve, is attached to the outboard surface 142 of hub cap outboard wall 76, and is in fluid communication with center port 140, as will be described in greater detail below. The attachment of dual wheel valve 144 to outboard surface 142 of outboard wall 76 is provided by bolts 146 (FIG. 4) or other fastening means, including mechanical fasteners and joining techniques, such as welding, adhesives, press fit and the like. Preferably, a gasket or O-ring 138 is disposed between dual wheel valve 144 and outboard surface 142 of outboard wall 76 about center port 140 to provide a fluid communication seal between the dual wheel valve and the hub cap outboard wall.

Dual wheel valve 144 incorporates two separate wheel valves 148A, 148B in a single body 150. Dual wheel valve 144 enables air to be provided to two separate tires from a single port, that is, center port 140 in hub cap 72, with a wheel valve 148A, 148B for each respective tire, without employing exterior pneumatic conduit or hoses. More particularly, air flows through center port 140 and into a distribution plate 152 of valve body 150. Distribution plate 152 divides the air flow into two separate paths, as shown by arrows A2 (FIG. 3A), so that air flows into each wheel valve 148A, 148B.

Each wheel valve 148A, 148B preferably is a diaphragm valve that remains open during all normal operating conditions, and is also capable of isolating each tire in tire inflation system 70 from one or more tires that experience a significant pressure loss, such as if a tire is punctured. Each wheel valve 148A, 148B is also capable of isolating each tire from other components of tire inflation system 70 if the system develops a leak that exceeds the inflation capacity of the system. More particularly, each wheel valve 148A, 148B preferably is spring biased and actuates or opens at a selected pressure setting or pressure level, which is reasonably below or less than the minimum pressure that would be expected to be utilized as a target tire pressure.

For example, wheel valve 148A, 148B may open or actuate at a reasonable predetermined pressure level that is lower than the target inflation pressure, such as at about 70 pounds per square inch (psi) when the target inflation pressure is at about 90 psi. Alternatively, wheel valve 148A, 148B may open or actuate at a pressure level that is a set reasonable amount less than the target inflation pressure, such as a value of about 20% less than the target inflation pressure, or a value of about 20-30 psi less than the target inflation pressure. In this manner, each wheel valve 148A, 148B remains open during all normal operating conditions, thereby enabling air to flow to the tires, and also enabling fluid communication between the tires for balancing of pneumatic pressure, as will be described in greater detail below.

In the event of a significant pressure loss in one of the tires or in the pneumatic components of tire inflation system 70 that allows the pressure level in pneumatic conduit 96 to fall below the selected pressure setting, the spring bias of wheel valves 148A, 148B causes them to close, thus isolating each tire from the rest of the tire inflation system. For example, if the opening or actuation pressure level of wheel valve 148A, 148B is 70 psi and the pressure in pneumatic conduit 96 drops below 70 psi, each wheel valve closes and thus isolates the tires. Actuation of each wheel valve 148A, 148B at a reasonable pressure level below the target inflation pressure prevents excessive deflation of the tires and thereby provides emergency protection, in contrast to wheel valves of the prior art. More particularly, prior art wheel valves open at an extremely low pressure level, such as about 10-20 psi. As a result, in the event that one or more tires experience a significant pressure loss or system 70 develops a leak that exceeds the inflation capacity of the system, the prior art wheel valves remain open until the system pressure drops to 10-20 psi, which in turn allows significant undesirable deflation of the tires.

Each wheel valve 148A, 148B also provides means to enable reduction of the pressure loss in the tires when the vehicle has been parked by responding to the engagement of the vehicle parking brake, or to other conditions that indicate the vehicle has been parked. More particularly, when a vehicle has been parked for an extended period of time, the pneumatic pressure in the vehicle supply tank may drop or bleed down due to small air leaks that are typical in any pneumatic system. If the inflation path from the supply tank to the tires remains open, the pneumatic pressure in the tires drops when the pneumatic pressure in the supply tank drops. This may be a drop of up to about twenty-five (25) psi for each tire. Then, when the vehicle is started up to prepare for over-the-road travel, the tires 14 must be re-inflated up to or near the target pressure, which may involve adding about 25 psi to multiple tires. Such re-inflation typically takes a great deal of time, and if the vehicle operator does not wait for the tires to be re-inflated to the target pressure before operating the vehicle, the tires in turn may be operated in an under-inflated condition until the target pressure is reached, which reduces the life of the tires. To minimize pressure loss and the need to provide significant re-inflation of the tires, each wheel valve 148A, 148B can be rapidly and/or reliably closed when the vehicle is parked, thus enabling isolation of the tires from the supply tank, as more fully described in a separate application entitled "Tire Inflation System with Discrete Deflation Circuit" being filed concurrently herewith, and which is assigned to the same Assignee as the present invention.

When each wheel valve 148A, 148B is open, air flows from each respective wheel valve through a respective offset port 154A, 154B, as indicated by arrows A3 (FIG. 3A). Each offset port 154A, 154B is formed in hub cap outboard wall 76 in an axial orientation and located radially outward of center port 140 in alignment with and in fluid communication with a port of its respective wheel valve 148A, 148B. Each offset port 154A, 154B extends from outboard surface 142 of hub cap outboard wall 76 to and in fluid communication with a respective cylindrical bore 112A, 112B, which is also formed in the hub cap outboard wall. Preferably, a gasket or O-ring 156A, 156B is disposed between dual wheel valve 144 and outboard surface 142 of hub cap outboard wall 76 about each respective offset port 154A, 154B to provide a fluid communication seal between the dual wheel valve and the hub cap outboard wall.

With continuing reference to FIGS. 2-4, cylindrical bores 112A, 112B are formed in hub cap outboard wall 76 to enable the connection of tire hoses 118A, 118B to hub cap 72. Preferably, cylindrical bores 112A, 112B are formed approximately one-hundred-eighty (180) degrees from one another in hub cap outboard wall 76, which enables optimum configuration for two tires hoses 118A, 118B, with each hose extending to a respective one of a pair of tires of a heavy-duty vehicle dual-wheel configuration, as will be described in greater detail below. Each bore 112A, 112B extends radially inwardly from the exterior of hub cap cylindrical side wall 74 and generally perpendicular to its respective offset port 154A, 154B, and is in fluid communication with its respective offset port.

Reference shall now be made to a first bore 112A and its related structure, components and configuration for the purpose of convenience, with the understanding that such structure, components and configuration also applies to second bore 112B. Hub cap outboard wall 76 preferably is formed with features such as threads 116 about each bore 112A, which threadably engage a coupling 114 of tire hose 118A to secure the direct connection of the tire hose to the hub cap. Each tire hose 118A also includes a tire hose fitting 120 and a first check valve assembly 134, which preferably is a Schrader-type or stem-type check valve. Tire hose fitting 120 is received in a fixed bushing or sleeve 122 that seats in bore 112A, and Schrader valve 134 seats in the tire hose fitting. When tire hose 118A is connected to hub cap 72, Schrader valve 134 is held open by a poppet valve assembly 124, which is described in detail below, to enable air to flow through the Schrader valve. When tire hose coupling 114 and fitting 120 are uncoupled and removed from sleeve 122, Schrader valve 134 remains with the hose coupling to prevent excessive escape of air from the tire upon removal of tire hose 118A, and the sleeve remains in the bore.

A second check valve assembly 124, which preferably is a poppet valve, seats in sleeve 122 and prevents excessive venting of air from tire inflation system 70 upon the removal of tire hose 118A from hub cap 72. More particularly, sleeve 122 is formed with a taper 126 on its radially inward end, which corresponds to the radially inward end of bore 112. Poppet valve assembly 124 includes a spring 128, a seat 130, and an o-ring 132 mounted on the seat. When tire hose 118A is connected to hub cap 72, tire hose fitting 120 pushes seat 130, o-ring 132 and spring 128 radially inwardly, which creates a space or gap between the o-ring and sleeve taper 126 through which air flows. When tire hose 118A is removed from hub cap 72, the bias of spring 128 urges seat 130 and o-ring 132 radially outwardly, so that the o-ring contacts sleeve taper 126 to close the space or gap, thereby preventing air from flowing through poppet valve assembly 124.

The structure of first embodiment tire inflation system 70 provides continuous balancing of pneumatic pressure across all of the tires in the system. More particularly, in a pneumatically balanced system 70, the tires are in fluid communication with one another, and according to the principles of fluid flow, all of the tires have a generally uniform, or balanced, inflation pressure. When this uniform inflation pressure is above the target pressure, the means that are employed to monitor the tire pressure enable tire inflation system 70 to decrease the uniform pressure by venting excess air to atmosphere as described above, which in turn respectively decreases the inflation pressure of all of the tires in the system to the target pressure. When this uniform inflation pressure is below the target pressure, the means that are employed to monitor the tire pressure enable tire inflation system 70 to increase the uniform pressure by supplying air from a vehicle air tank as described above, which in turn respectively increases the inflation pressure of all of the tires in the system to the target pressure.

In addition, such fluid communication between all of the tires in tire inflation system 70 enables each pair of tires in a dual-wheel configuration to have the same pressure level and thus the same actual diameter, which reduces or eliminates the chance that one of the tires will experience scrubbing, which increases the life of the tires. Moreover, the fluid communication between all of the tires in tire inflation system 70 enables tires that are at the target pressure to contribute air to a tire with an excessively low inflation pressure, reducing the chance that a tire may operate with an excessively low inflation pressure.

With particular reference now to FIGS. 3A and 3B, the continuous balancing of pneumatic pressure of first embodiment tire inflation system 70 is provided by the unique manifolding path provided by hub cap 72 and dual wheel valve 144, which is integrated or directly attached to the hub cap. More particularly, the manifolding path may be illustrated using inflation of the vehicle tires by way of example.

When the means that are employed to monitor the pneumatic pressure in the tires, as described above, determine that the pressure in the tires is below a desired level, the means actuate inflation of the tires. During inflation, as shown in FIG. 3A, air flows from the vehicle supply tank, through pneumatic conduit 96, through central bore 100 of rotary union stem 90 and into supply cavity 110, as indicated by arrow A1. Air then flows from supply cavity 110 into center port 140 and enters dual wheel valve 144, where the air flow is split into two paths or flows by distribution plate 152, as indicated by arrows A2. Air then flows through each respective wheel valve 148A, 148B and into each respective offset port 154A, 154B, as indicated by arrows A3. Air flows from each respective offset port 154A, 154B through a respective poppet valve assembly 124 and check valve assembly 120 in corresponding bore 112A, 112B, as indicated by arrows A4, and into tire hoses 118A, 118B and respective tires. Under normal operating conditions, this manifolding air path remains open in first embodiment tire inflation system 70 to provide a constant-pressure system that continuously balances pneumatic pressure across all of the tires in the system during inflation.

More particularly, first tire hose 118A, first cylindrical bore 112A, first offset port 154A, and first wheel valve 148A fluidly communicate with second wheel valve 148B, second offset port 154B, second cylindrical bore 112B, and second tire hose 118B at center port 140 along the fluid path provided from each respective wheel valve to the center port by distribution plate 152. This fluid path provides fluid communication between each tire in a dual-wheel configuration. In addition, as indicated by arrow A1, the fluid path continues from center port 140 through supply cavity 110, central bore 100 of rotary union stem 90, and through pneumatic conduit 96. Pneumatic conduit 96 is fluidly connected to the remainder of the tires in the system, and thus enables fluid communication between all of the tires in tire inflation system 70. Such fluid communication between the tires enables them to have a generally uniform, or balanced, inflation pressure.

When the means that are employed to monitor the pneumatic pressure in the tires, as described above, determine that the pressure in the tires is above a desired level, the means actuate deflation of the tires. Typically in deflation, air is removed from the system via pneumatic conduit 96 and vented to atmosphere. The manifolding air path remains open in first embodiment tire inflation system 70 during deflation, as shown in FIG. 3B. More specifically, when each tire hose 118A, 118B is connected to hub cap 72, tire hose fitting 120 in each respective cylindrical bore 112A, 112B maintains each respective poppet valve assembly 124 in an open position, thereby enabling air to flow out of the tires through check valve assembly 134 and the poppet valve assembly, as indicated by arrows B1. Air then flows through each respective offset port 154A, 154B to each respective wheel valve 148A, 148B, as indicated by arrows B2.

More particularly, as described above, each wheel valve 148A, 148B preferably is spring biased and actuates or opens at a selected pressure level, such as about 70 psi, which is below the minimum pressure that would be expected to be utilized as a target tire pressure. As long as the pressure in the pneumatic conduit 96 is above this selected pressure level, each wheel valve 148A, 148B remains open, thereby enabling air to flow through each wheel valve. Air then flows from each respective wheel valve 148A, 148B through distribution plate 152, as indicated by arrows B3. After flowing through distribution plate 152, each separate air flow stream merges into a single air flow stream in hub cap center port 140.

It is at this point that fluid communication between the tires for continuous balancing of pneumatic pressure takes place. More particularly, first tire hose 118A, first cylindrical bore 112A, first offset port 154A, and first wheel valve 148A fluidly communicate with second wheel valve 148B, second offset port 154B, second cylindrical bore 112B, and second tire hose 118B at center port 140 along the fluid path provided from each respective wheel valve to the center port by distribution plate 152. This fluid path provides fluid communication between each tire in a dual-wheel configuration. In addition, as indicated by arrow B4, the fluid path continues from center port 140 through supply cavity 110, central bore 100 of rotary union stem 90, and through pneumatic conduit 96. Pneumatic conduit 96 is fluidly connected to the remainder of the tires in the system, and thus enables fluid communication between all of the tires in tire inflation system 70. Such fluid communication between the tires enables them to have a generally uniform, or balanced, pressure when system 70 is in a deflation mode.

It is to be understood that the manifolding air path described above for first embodiment tire inflation system 70 provides fluid communication between all of the tires in the system during inflation and deflation, and when the system is not engaged in inflation or deflation. As a result, first embodiment tire inflation system 70 provides a constant-pressure system that continuously balances pneumatic pressure across all of the tires in the system.

In this manner, hub cap 72 and integrated dual wheel valve 144 of first embodiment tire inflation system 70 cooperate to provide a unique manifolding path that continuously balances pneumatic pressure between all of the tires in tire inflation system 70 under normal operating conditions, without any electronic components or controllers. In addition, first embodiment tire inflation system 70 compensates for ambient temperature changes, as the fluid communication between the tires provided by hub cap 72 and integrated dual wheel valve 144 enables increases in pneumatic pressure that are attributable to increases in ambient temperature to be relieved to atmosphere through a control valve assembly (not shown), which is fluidly connected to pneumatic conduit 96. The fluid communication between the tires provided by hub cap 72 and integrated dual wheel valve 144 also enables decreases in pneumatic pressure that are attributable to decreases in ambient temperature to be addressed through the introduction of air into pneumatic conduit 96, as described above.

Moreover, the unique manifolding path provided by hub cap 72 and integrated dual wheel valve 144 connects rotary union 86, the dual wheel valve, and tire hoses 118A, 118B with no intermediate hoses or conduit. The elimination of intermediate hoses or conduit in turn reduces the cost and complexity of first embodiment tire inflation system 70 when compared to prior art tire inflation systems 40.

Integrated dual wheel valve 144 of first embodiment tire inflation system 70 also provides emergency protection in the event that a tire in the system experiences significant pressure loss, or if the components of the system develop a leak that exceeds the inflation capacity of the system. For example, if a specific tire is punctured or a pneumatic conduit ruptures, the pressure in pneumatic conduit 96 may drop. When the pneumatic pressure in pneumatic conduit 96 drops, wheel valves 148A, 148B detect the pressure drop. As described above, when the pressure detected by wheel valves 148A, 148B drops below the selected actuation or opening pressure level for the valves, which is below the minimum pressure that would be expected to be utilized as a target tire pressure, the valves close. Once wheel valves 148A, 148B close, air flow to and from respective tire hoses 118A, 118B and thus the respective tires is terminated, thereby isolating each tire from the remainder of tire inflation system 70.

Each wheel valve 148A, 148B also provides means to reduce the pressure loss in the tires when the vehicle has been parked for an extended period of time. More particularly, each wheel valve 148A, 148B is able to be rapidly and/or reliably closed when the vehicle is parked, thereby enabling isolation of the tires from the supply tank.

Dual wheel valve 144 of first embodiment tire inflation system 70 includes additional advantages. For example, by incorporating two separate wheel valves 148A, 148B into a single valve body 150, dual wheel valve 144 is able to supply air to multiple tires from a single pneumatic supply conduit 96, and in cooperation with hub cap 72, is able to balance air between those tires. Dual wheel valve 144 provides a convenient, compact unit, while also monitoring the pneumatic pressure in separate tires via separate wheel valves 148A, 148B. By being mounted directly to hub cap 72, dual wheel valve 144 eliminates external hoses or conduit, in turn reducing the cost and complexity of first embodiment tire inflation system 70 when compared to prior art tire inflation systems 40. In addition, by being a discrete unit, dual wheel valve 144 may be built or constructed separately from hub cap 72 and later mounted on the hub cap, thereby providing more economical manufacturing, and also may be removed from the hub cap for servicing.

Optionally, components of first embodiment tire inflation system 70 provide a modular design that enables different configurations for the system, depending on design and/or use requirements. As shown in FIGS. 2-4, hub cap 72 of first embodiment tire inflation system 70 may be configured for tire inflation, deflation, and pneumatic balancing by employing hub cap 72 with dual wheel valve 144 and rotary union 86.

Figure 5:
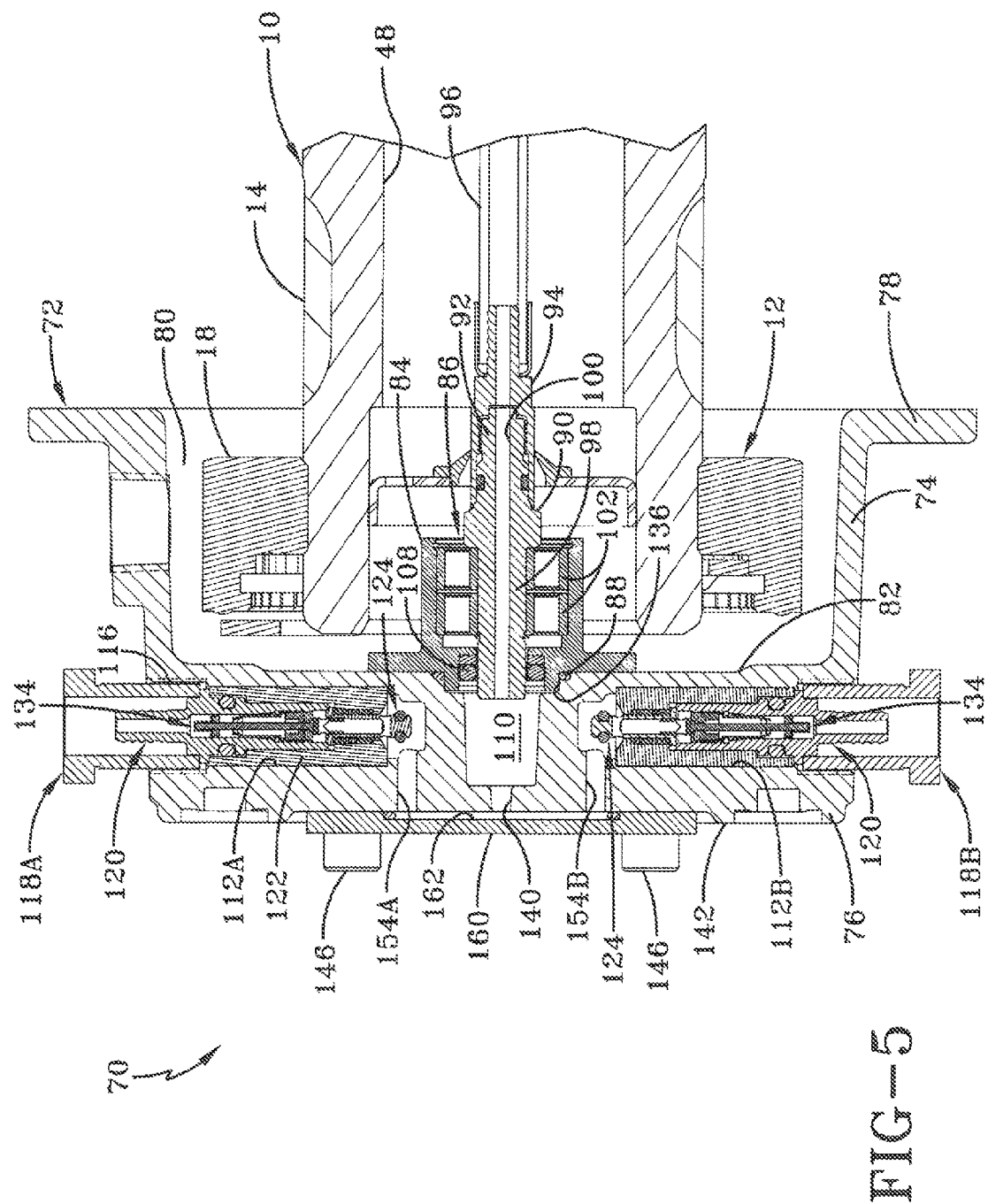
FIG. 5 is a fragmentary cross-sectional elevational view of components of the first exemplary embodiment constant pressure pneumatic balancing tire inflation system, shown in an inflation-only configuration.

Alternatively, as shown in FIG. 5, first embodiment tire inflation system 70 may employ hub cap 72 and rotary union 86 without dual wheel valve 144 to provide tire inflation without deflation and pneumatic balancing. More particularly, an outboard cover plate 160 formed with a channel 162 may be mounted to outboard surface 142 of hub cap outboard wall 76. Channel 162 enables air to flow from center port 140 to each respective offset port 154A, 154B, through cylindrical bores 112A, 112B, and through tire hoses 118A, 118B to the tires. When cover plate 160 is used, the shape of poppet valve assembly 124 is configured so that it does not hold Schrader valve 134 open. As a result, air is able to flow from each offset port 154A, 154B through respective tire hoses 118A, 118B and into the tires, but is unable to flow back out of the tires. Because air is unable to flow from tires back through outboard cover plate 160 to center port 140 in this configuration, tire inflation system 70 provides tire inflation without deflation or balancing.

Figure 6:
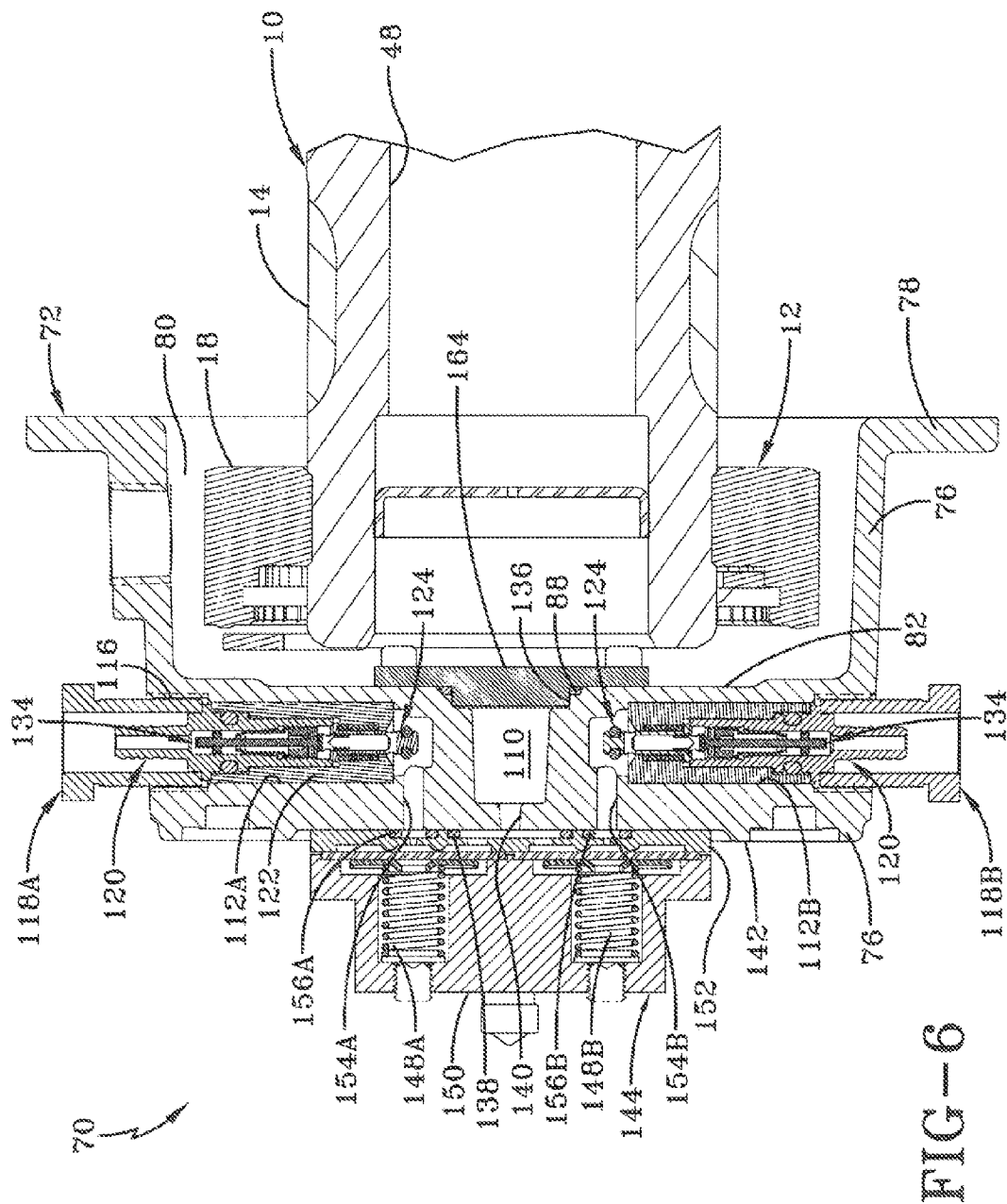
FIG. 6 is a fragmentary cross-sectional elevational view of components of the first exemplary embodiment constant pressure pneumatic balancing tire inflation system, shown in a balancing-only configuration.

As an additional alternative, as shown in FIG. 6, first embodiment tire inflation system 70 may employ hub cap 72 and dual wheel valve 144 to enable fluid communication and pneumatic balancing between the tires independently of rotary union 86 and pneumatic conduit 96 (FIG. 5). More particularly, an inboard cover plate 164 may be mounted on inboard surface 82 of hub cap outboard wall 76 over supply cavity 110. Hub cap 72 and dual tire valve 144 enable fluid communication between the tires and enables them to have a generally uniform or balanced inflation pressure. More specifically, first tire hose 118A, first cylindrical bore 112A, first offset port 154A, and first wheel valve 148A fluidly communicate with second wheel valve 148B, second offset port 154B, second cylindrical bore 112B, and second tire hose 118B at center port 140 along the fluid path provided from each respective wheel valve to the center port by distribution plate 152. Because supply cavity 110 is covered by inboard cover plate 164, there is no fluid communication past supply cavity 110, so that in this configuration, dual wheel valve 144 provides pneumatic balancing between the tires independently of inflation or deflation.

The modular design of components of first embodiment tire inflation system 70 enable a standard or stock heavy-duty vehicle to be easily converted between different configurations for the system, such as inflation, deflation and pneumatic balancing; inflation without deflation and pneumatic balancing; and pneumatic balancing independently of inflation and deflation. First embodiment tire inflation system 70 enables such a conversion to be made quickly and easily using one hub cap 72 and simple outboard and inboard cover plates 160, 164, respectively.

Turning now to FIGS. 7-12B, a second and preferred exemplary embodiment of a constant pressure pneumatic balancing tire inflation system of the present invention is indicated generally at 170. Second exemplary embodiment tire inflation system 170 integrates a wheel valve assembly 172, shown by way of example as a dual wheel valve, into an intermediate wall 174 of a hub cap 176, as will be described in greater detail below. Integrating dual wheel valve 172 into hub cap intermediate wall 174 protects the wheel valve from environmental impact and environmental contamination. It is to be understood that tire inflation system 170 includes an air source, such as an air tank (not shown), which is in fluid communication with the vehicle tires (not shown) via a pneumatic conduit 96 (FIG. 2) and other components, which will be described in detail below. It is also to be understood that means known to those skilled in the art, such as mechanically-operated regulator valves (not shown), are fluidly connected to pneumatic conduit 96 and are employed to monitor the pneumatic pressure in the tires and to actuate inflation and/or deflation of the tires.

With particular, reference now to FIGS. 7-9 and 12A-12B, hub cap 176 of second exemplary embodiment tire inflation system 170 includes a cylindrical side wall 178. Intermediate wall 174 is integrally formed between an inboard end of hub cap 176 and an outboard end 200 of side wall 178, and preferably nearer to the side wall outboard end, and extends generally perpendicular to the side wall. It is to be understood that other shapes and configurations of hub cap side wall 178 and intermediate wall 174 may be employed without affecting the overall concept or operation of the present invention, such as an integrated dome or cone shape formed as one piece or multiple pieces, and/or adjusting the intermediate wall to be an outboard wall. A radially-extending flange 180 is formed on an inboard end of side wall 178, and is formed with a plurality of bolt openings 182 to enable bolts (not shown) to secure hub cap 176 to the outboard end of wheel hub 22 (FIG. 1). In this manner, hub cap 176 defines an interior compartment 184. It is to be understood that means known to those skilled in the art other than bolts may be used to secure hub cap 176 to wheel hub 22, such as a threaded connection between the hub cap and wheel hub, other types of mechanical fasteners, and/or a press fit.

With additional reference to FIG. 10, hub cap 176 also includes a discrete outboard wall 190 that seats in a circumferentially-extending groove 192 formed in side wall outboard end 200. Outboard wall 190 extends generally perpendicular to side wall 178, and a fluid seal is provided between the outboard wall and the hub cap side wall by an inner gasket 194, which is disposed between the outboard wall and the base of groove 192. Outboard wall 190 is secured in groove 192 by a retaining ring 196. An outer gasket 198 is disposed between outboard wall 190 and retaining ring 196 to provide a fluid seal between the outboard wall and the retaining ring. Retaining ring 196 is formed with openings 202, and bolts or other mechanical fasteners 228 extend through the retaining ring openings and aligned ones of openings 197 and 199 formed in outer gasket 198 and side wall outboard end 200, respectively, to secure the retaining ring and the outer gasket to the hub cap side wall. Optionally, outboard wall 190 may be transparent or translucent in order to provide convenient visual inspection of the wheel end lubricant level when an oil-type lubricant is employed. When grease-type lubricant is employed, outboard wall 190 may be opaque.

A pneumatic distribution plate 204 is disposed between hub cap intermediate wall 174 and rotary union 86. More particularly, pneumatic distribution plate 204 includes an outboard surface 206 (FIG. 12B) that is disposed against an inboard surface 186 of hub cap intermediate wall 174, and an inboard surface 208 (FIG. 12A) that is disposed against rotary union 86. Preferably, bolts 188 or other mechanical fasteners secure cylindrical housing 84 of rotary union 86 to pneumatic distribution plate 204, and also secure the pneumatic distribution plate to inboard surface 186 of hub cap intermediate wall 174. The construction of rotary union 86 is similar to that as described above for first embodiment tire inflation system 70, including a stem 90 having inboard portion 92 that engages pneumatic conduit 96 (FIG. 2) and outboard portion 98 that is rotatably mounted in rotary union housing 84 via bearings 102.

By way of example, to inflate the vehicle tires, air flows from pneumatic conduit 96 through central bore 100 formed in rotary union stem 90 to pneumatic distribution plate 204. With particular reference to FIGS. 8-9 and 12A-12B, pneumatic distribution plate 204 includes a central recess 210, which enables housing 84 of rotary union 86 to seat on inboard surface 208 of the pneumatic distribution plate. When rotary union 86 seats on inboard surface 208 of pneumatic distribution plate 204, a supply cavity 212 is formed between the rotary union and the pneumatic distribution plate at central recess 210. A pair of supply openings 214 is formed in pneumatic distribution plate 204 at central recess 210, which enables air to flow from central bore 100 of rotary union stem 90, through supply cavity 212 and into the pneumatic distribution plate.

Figure 7:
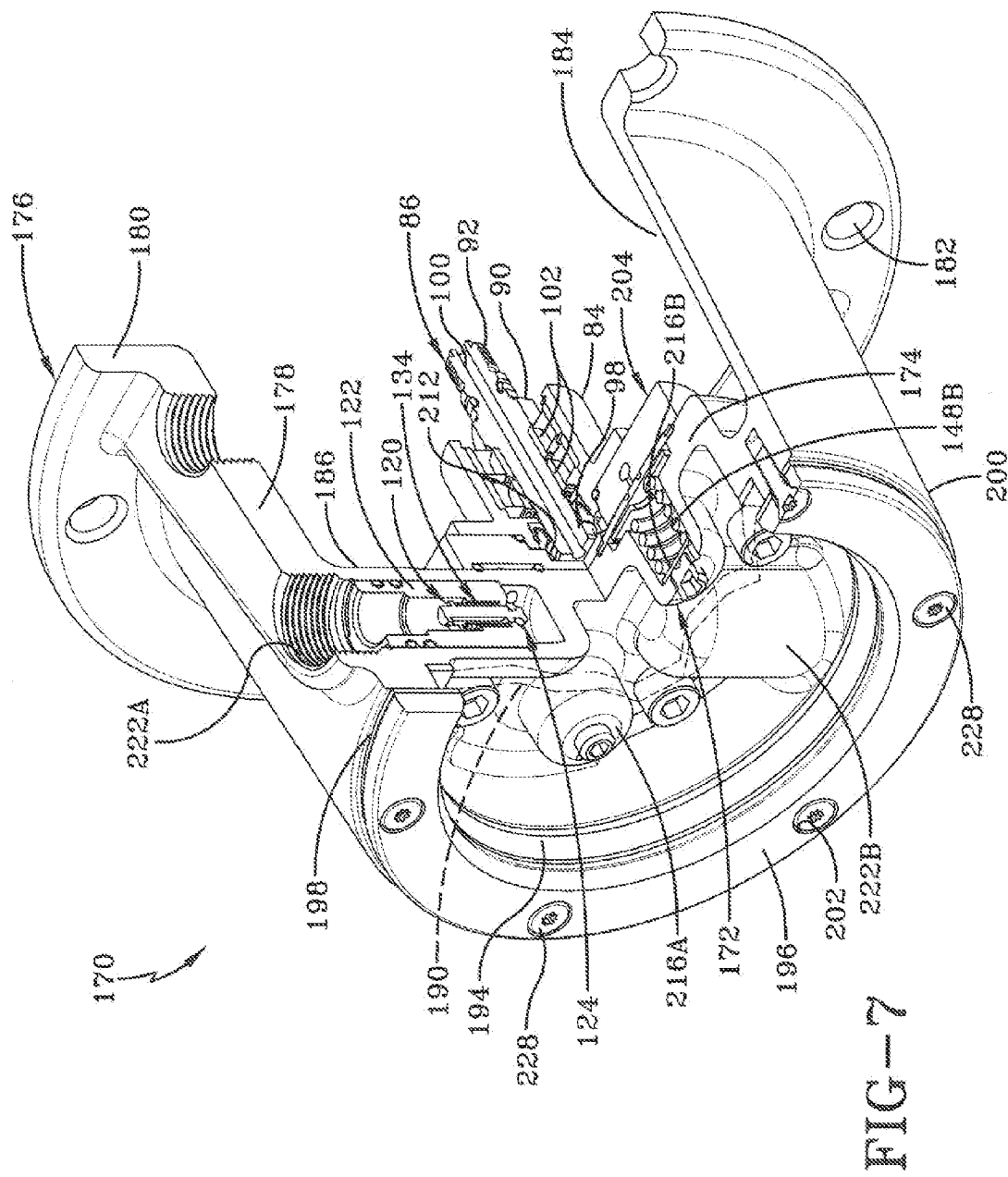
FIG. 7 is a perspective view, with portions broken away and in section, of certain components of a second exemplary embodiment constant pressure pneumatic balancing tire inflation system of the present invention.
Figure 11B:
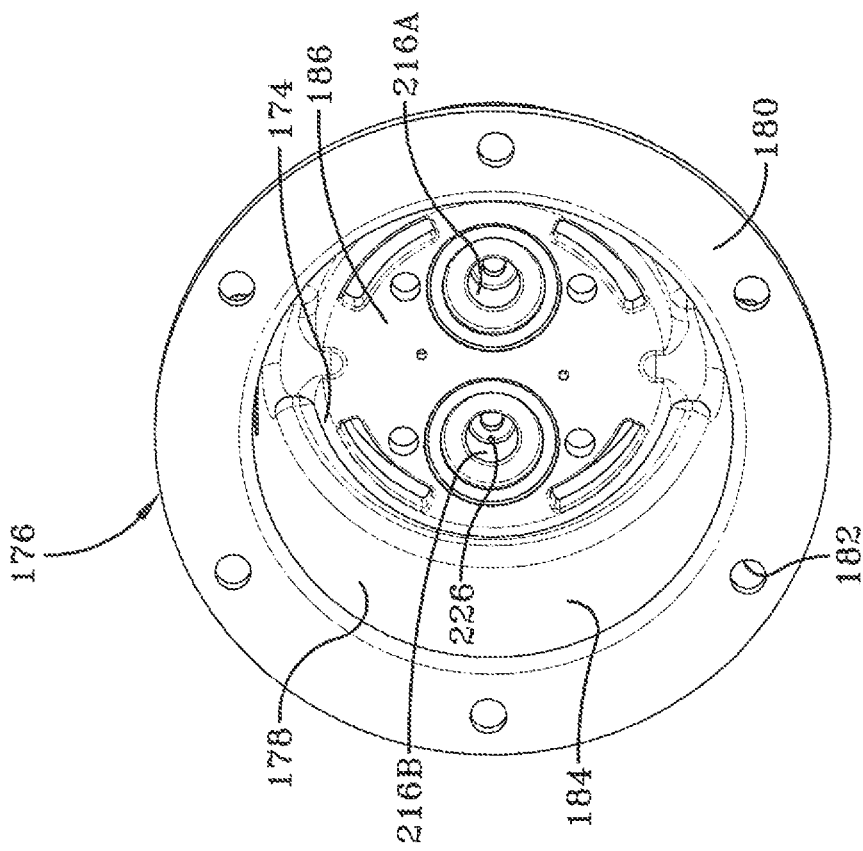
FIG. 11B is an inboard perspective view of the hub cap of the second exemplary embodiment constant pressure pneumatic balancing tire inflation system of the present invention shown in FIG. 7.
Figure 11A:
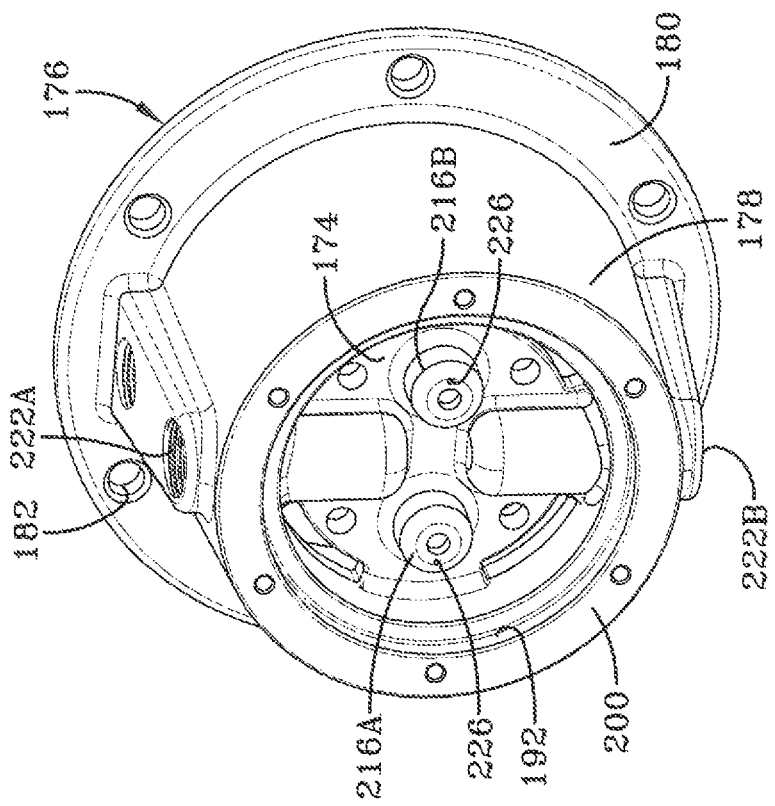
FIG. 11A is an outboard perspective view of the hub cap of the second exemplary embodiment constant pressure pneumatic balancing tire inflation system of the present invention shown in FIG. 7.
Figure 12A:
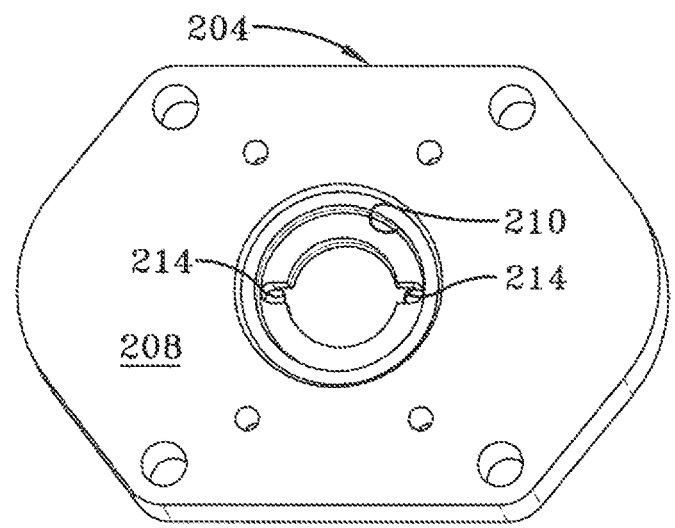
FIG. 12A is an inboard perspective view of the pneumatic distribution plate of the second exemplary embodiment constant pressure pneumatic balancing tire inflation system of the present invention shown in FIG. 7.
Figure 12B:
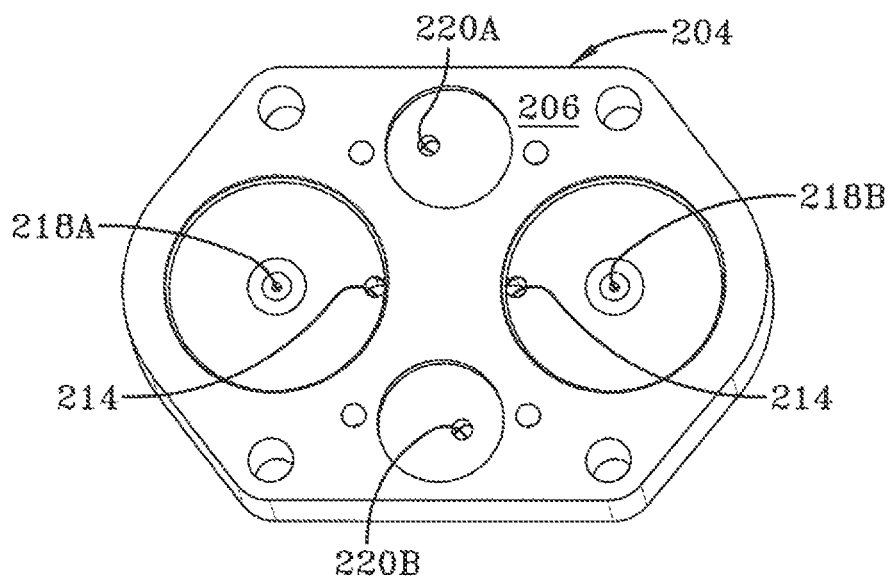
FIG. 12B is an outboard perspective view of the pneumatic distribution plate of the second exemplary embodiment constant pressure pneumatic balancing tire inflation system of the present invention shown in FIG. 7.

With additional reference to FIG. 7, each one of supply openings 214 in pneumatic distribution plate 204 fluidly communicate with a respective wheel valve 148A, 148B housed in hub cap intermediate wall 174. More particularly, hub cap intermediate wall 174 acts as a dual wheel valve housing, being formed with respective integral wheel valve housing chambers 216A, 216B. Hub cap intermediate wall 174 enables air to be provided to two separate tires from a single port, that is, from supply cavity 212, with a wheel valve 148A, 148B mounted in each wheel valve housing chamber 216A, 216B for, each respective tire, without employing exterior pneumatic conduit or hoses. More particularly, air flows through supply cavity 212 and through supply openings 214 in pneumatic distribution plate 204, which divide the air flow into two separate paths, so that air flows into each wheel valve 148A, 148B.

Each wheel valve 148A, 148B is similar to that as described above for first embodiment tire inflation system 70. More particularly, each wheel valve 148A, 148B preferably is a diaphragm valve that remains open during all normal operating conditions and is also capable of isolating each tire in tire inflation system 170 from one or more tires that experience a significant pressure loss, such as if the tire is punctured. Each wheel valve 148A, 148B is also capable of isolating each tire from the other components of tire inflation system 170 if the system develops a leak that exceeds the inflation capacity of the system. That is, each wheel valve 148A, 148B preferably is spring biased and actuates or opens at a selected pressure setting or pressure level, which is below or less than the minimum pressure that would be expected to be utilized as a target tire pressure.

For example, wheel valve 148A, 148B may open or actuate at a reasonable predetermined pressure level that is lower than the target inflation pressure, such as at about 70 pounds per square inch (psi) when the target inflation pressure is at about 90 psi. Alternatively, wheel valve 148A, 148B may open or actuate at a pressure level that is a set reasonable amount less than the target inflation pressure, such as a value of about 20% less than the target inflation pressure, or a value of about 20-30 psi less than the target inflation pressure. In this manner, each wheel valve 148A, 148B remains open during all normal operating conditions, thereby enabling air to flow to the tires, and also enabling fluid communication between the tires for balancing of pneumatic pressure, as will be described in greater detail below.

In the event of a significant pressure loss in one of the tires or in the pneumatic components of tire inflation system 170 that allows the pressure level in pneumatic conduit 96 to fall below the selected pressure setting, the spring bias of wheel valves 148A, 148B causes them to close, thus isolating each tire from the rest of the tire inflation system. For example, if the opening or actuation pressure level of wheel valve 148A, 148B is 70 psi and the pressure in pneumatic conduit 96 drops below 70 psi, each wheel valve closes and thus isolates the tires. Actuation of each wheel valve 148A, 148B at a reasonable pressure level below the target inflation pressure prevents excessive deflation of the tires and thereby provides emergency protection, in contrast to wheel valves of the prior art. More particularly, prior art wheel valves open at an extremely low pressure level, such as about 10-20 psi. As a result, in the event that one or more tires experience a significant pressure loss or system 170 develops a leak that exceeds the inflation capacity of the system, the prior art wheel valves remain open until the system pressure drops to 10-20 psi, which in turn allows significant undesirable deflation of the tires.

In addition, each wheel valve 148A, 148B provides means to enable isolation of the tires from the vehicle supply tank by being rapidly and/or reliably closed when the vehicle is parked for an extended period of time. As described above, each wheel valve 148A, 148B is able to respond to the engagement of the vehicle parking brake, or to other conditions that indicate the vehicle has been parked. In this manner, if there is a drop in the supply tank pressure while the vehicle is parked, the isolation of the tires that is enabled by wheel valves 148A, 148B prevents that drop from reducing the tire pressure.

When each wheel valve 148A, 148B is open, air flows from each respective wheel valve through a respective wheel valve exit port 218A, 218B formed in pneumatic distribution plate 204, through a respective channel 224 (FIG. 8) formed in the pneumatic distribution plate, and out of the pneumatic distribution plate through a respective exit port 220A, 220B formed in the plate. Each exit port 220A, 220B of pneumatic distribution plate 204 is in fluid communication with a respective cylindrical bore 222A, 222B formed in hub cap intermediate wall 174.

Cylindrical bores 222A, 222B are similar to cylindrical bores 112A, 112B that are described above for first embodiment tire inflation system 70. Preferably, cylindrical bores 222A, 222B are formed approximately one-hundred-eighty (180) degrees from one another in hub cap intermediate wall 174, which enables optimum configuration for two tires hoses 118A, 118B (FIG. 2), with each hose extending to a respective one of a pair of tires of a heavy-duty vehicle dual-wheel configuration. As with first embodiment tire inflation system 70, a coupling 114 of each tire hose 118A, 118B secures the direct connection of each respective tire hose 118A, 118B to hub cap 176.

Reference shall now be made to a first bore 222A and its related structure, components and configuration for the purpose of convenience, with the understanding that such structure, components and configuration also applies to second bore 222B. Fixed bushing or sleeve 122 is received in bore 222A, and tire hose fitting 120 of tire hose 118A seats in the sleeve. Tire hose 118A also includes Schrader valve 134, which seats in tire hose fitting 120. Poppet valve assembly 124 is similar to that as described above for first embodiment tire inflation system 70, preventing excessive venting of air from second embodiment tire inflation system 170 upon the removal of tire hose 118A from hub cap 176.

The structure of second embodiment tire inflation system 170 provides continuous balancing of pneumatic pressure across all of the tires in the system. More particularly, in a pneumatically balanced system 170, the tires are in fluid communication with one another, and according to the principles of fluid flow, all of the tires have a generally uniform, or balanced, inflation pressure. When this uniform inflation pressure is above the target pressure, the means that are employed to monitor the tire pressure enable tire inflation system 170 to decrease the uniform pressure by venting excess air to atmosphere as described above, which in turn decreases the inflation pressure of all of the tires in the system to the target pressure. When this uniform inflation pressure is below the target pressure, the means that are employed to monitor the tire pressure enable tire inflation system 170 to increase the uniform pressure by supplying air from a vehicle air tank as described above, which in turn increases the inflation pressure of all of the tires in the system to the target pressure.

In addition, such fluid communication between all of the tires in tire inflation system 170 enables each pair of tires in a dual-wheel configuration to have the same pressure level and thus the same actual diameter, which reduces or eliminates the chance that one of the tires will experience scrubbing, which increases the life of the tires. Moreover, the fluid communication between all of the tires in tire inflation system 170 enables tires that are at the target pressure to contribute air to a tire with an excessively low inflation pressure, reducing the chance that a tire may operate with an excessively low inflation pressure.

The continuous balancing of pneumatic pressure of first embodiment tire inflation system 170 is provided by the unique manifolding path provided by hub cap 176. More particularly, the manifolding path may be illustrated using inflation of the vehicle tires by way of example.

When the means that are employed to monitor the pneumatic pressure in the tires, as described above, determine that the pressure is below a desired level, the means actuate inflation of the tires. During inflation, air flows from the vehicle supply tank, through pneumatic conduit 96 (FIG. 3A), through central bore 100 of rotary union stem 90 and into supply cavity 212. Air then flows from supply cavity 212 through supply openings 214 in pneumatic distribution plate 204, which divide the air flow into two separate paths. Air from each path flows through each respective wheel valve 148A, 148B, through a respective wheel valve exit port 218A, 218B in pneumatic distribution plate 204, out of the pneumatic distribution plate through a respective exit port 220A, 220B, and into a respective cylindrical bore 222A, 222B formed in hub cap intermediate wall 174. Air then flows through a respective poppet valve assembly 124 and check valve assembly 134 in corresponding bore 222A, 222B, and into tire hoses 118A, 118B and respective tires. Under normal operating conditions, this manifolding air path remains open in second embodiment tire inflation system 170 to provide a constant-pressure system that continuously balances pneumatic pressure across all of the tires in the system during inflation.

More particularly, first tire hose 118A, first cylindrical bore 222A, first exit port 220A, first wheel valve exit port 218A, and first wheel valve 148A fluidly communicate with second wheel valve 148B, second wheel valve exit port 218B, second exit port 220B, second cylindrical bore 222B, and second tire hose 118B at supply openings 214 and supply cavity 212 along the fluid path provided from each respective wheel valve to the supply cavity by hub cap intermediate wall 174 and pneumatic distribution plate 204. This fluid path provides fluid communication between each tire in a dual-wheel configuration. In addition, the fluid path continues from supply openings 214, through supply cavity 212, central bore 100 of rotary union stem 90, and through pneumatic conduit 96. Pneumatic conduit 96 is fluidly connected to the remainder of the tires in the system, and thus enables fluid communication between all of the tires in tire inflation system 170. Such fluid communication between the tires enables them to have a generally uniform, or balanced, inflation pressure.

When the means that are employed to monitor the pneumatic pressure in the tires, as described above, determine that the pressure in the tires is above a desired level, the means actuate deflation of the tires. Typically in deflation, air is removed from the system via pneumatic conduit 96 (FIG. 2) and vented to atmosphere. The manifolding air path remains open in second embodiment tire inflation system 170 during deflation. More specifically, when each tire hose 118A, 118B is connected to hub cap 176, tire hose fitting 120 in each respective cylindrical bore 222A, 222B maintains each respective poppet valve assembly 124 in an open position, thereby enabling air to flow from the tires through the check valve assembly 134 and the poppet valve assembly. Air then flows through a respective exit port 220A, 220B in pneumatic distribution plate 204, through a respective wheel valve exit port 218A, 218B of the pneumatic distribution plate, and into each respective wheel valve 148A, 148B.

As described above, each wheel valve 148A, 148B preferably is spring biased and actuates or opens at a selected pressure level, such as about 70 psi, which is below the minimum pressure that would be expected to be utilized as a target tire pressure. As long as the pressure in pneumatic conduit 96 is above this selected pressure level, each wheel valve 148A, 148B remains open, thereby enabling air to flow through each wheel valve. Air then flows from each respective wheel valve 148A, 148B through supply openings 214 in pneumatic distribution plate 204, and each separate air flow stream merges into a single air flow stream in supply cavity 212.

It is at this point that fluid communication between the tires for continuous balancing of pneumatic pressure takes place. More particularly, first tire hose 118A, first cylindrical bore 222A, first exit port 220A, first wheel valve exit port 218A, and first wheel valve 148A fluidly communicate with second wheel valve 148B, second wheel valve exit port 218B, second exit port 220B, second cylindrical bore 222B, and second tire hose 118B at supply openings 214 and supply cavity 212 along the fluid path provided from each respective wheel valve to the supply cavity by hub cap intermediate wall 174 and pneumatic distribution plate 204. This fluid path provides fluid communication between each tire in a dual-wheel configuration. In addition, the fluid path continues from supply openings 214, through supply cavity 212, central bore 100 of rotary union stem 90, and through pneumatic conduit 96 (FIG. 3B). Pneumatic conduit 96 is fluidly connected to the remainder of the tires in the system, and thus enables fluid communication between all of the tires in tire inflation system 170. Such fluid communication between the tires enables them to have a generally uniform, or balanced, pressure when system 170 is in a deflation mode.

It is to be understood that the manifolding air path described above for second embodiment tire inflation system 170 provides fluid communication between all of the tires in the system during inflation and deflation, and when the system is not engaged in inflation or deflation. As a result, second embodiment tire inflation system 170 provides a constant-pressure system that continuously balances pneumatic pressure across all of the tires in the system.

In this manner, hub cap 176 provides a unique manifolding path that continuously balances pneumatic pressure between all of the tires in tire inflation system 170 under normal operating conditions, without any electronic components or controllers. In addition, second embodiment tire inflation system 170 compensates for ambient temperature changes, as the fluid communication between the tires provided by hub cap 176 enables increases in pneumatic pressure that are attributable to increases in ambient temperature to be relieved to atmosphere through a control valve assembly (not shown), which is fluidly connected to pneumatic conduit 96. The fluid communication between the tires provided by hub cap 176 also enables decreases in pneumatic pressure that are attributable to decreases in ambient temperature to be addressed through the introduction of air into pneumatic conduit 96, as described above.

Moreover, the unique manifolding path provided by hub cap 176 connects rotary union 86, dual wheel valve 172, and tire hoses 118A, 118B with no intermediate hoses or conduit. The elimination of intermediate hoses or conduit in turn reduces the cost and complexity of second embodiment tire inflation system 170 when compared to prior art tire inflation systems 40.

Dual wheel valve 172 of second embodiment tire inflation system 170 also provides emergency protection in the event that a tire in the system experiences significant pressure loss, or if the components of the system develop a leak that exceeds the inflation capacity of the system. For example, if a specific tire is punctured or a pneumatic conduit ruptures, the pressure in pneumatic conduit 96 may drop. When the pneumatic pressure in pneumatic conduit 96 drops, wheel valves 148A, 148B detect the pressure drop. As described above, when the pressure detected by wheel valves 148A, 148B drops below the selected actuation or opening pressure level for the valves, which is below the minimum pressure that would be expected to be utilized as a target tire pressure, the valves close. Once wheel valves 148A, 148B close, air flow to and from respective tire hoses 118A, 118B and thus the respective tires is terminated, thereby isolating each tire from the remainder of tire inflation system 70.

Each wheel valve 148A, 148B also provides means to reduce the pressure loss in the tires when the vehicle has been parked for an extended period of time. More particularly, each wheel valve 148A, 148B is able to be rapidly and/or reliably closed when the vehicle is parked, thereby enabling the isolation of the tires from the supply tank.

Dual wheel valve 172 of second embodiment tire inflation system 170 includes additional advantages. For example, by incorporating two separate wheel valves 148A, 148B into intermediate hub cap wall 174, dual wheel valve 172 is able to supply air to multiple tires from a single pneumatic supply conduit 96, and is able to balance air between those tires. Dual wheel valve 172 also monitors the pneumatic pressure in separate tires via separate wheel valves 148A, 148B. By being integrated into intermediate wall 174 of hub cap 176, dual wheel valve 172 eliminates external hoses or conduit, in turn reducing the cost and complexity of second embodiment tire inflation system 170 when compared to prior art tire inflation systems 40.

By being integrated into intermediate wall 174 of hub cap 176, dual wheel valve 172 is inside the hub cap, and thus is protected from environmental impact and environmental contamination. In addition, by being inside hub cap 176, dual wheel valve 172 includes a protected vent path for each wheel valve 148A, 148B, enabling each wheel valve housing chamber 216A, 216B to open directly into hub cap interior compartment 184 and vent via vent openings 226 (FIGS. 11A and 11B) through axle 10 (FIG. 2), which reduces the introduction of environmental contaminants into the wheel valves. Integrating dual wheel valve 172 into hub cap intermediate wall 174 also enables each wheel valve 148A, 148B to be disposed in a tamper-resistant location, thereby preventing unauthorized adjustment of the wheel valve pressure settings.

Figure 14:
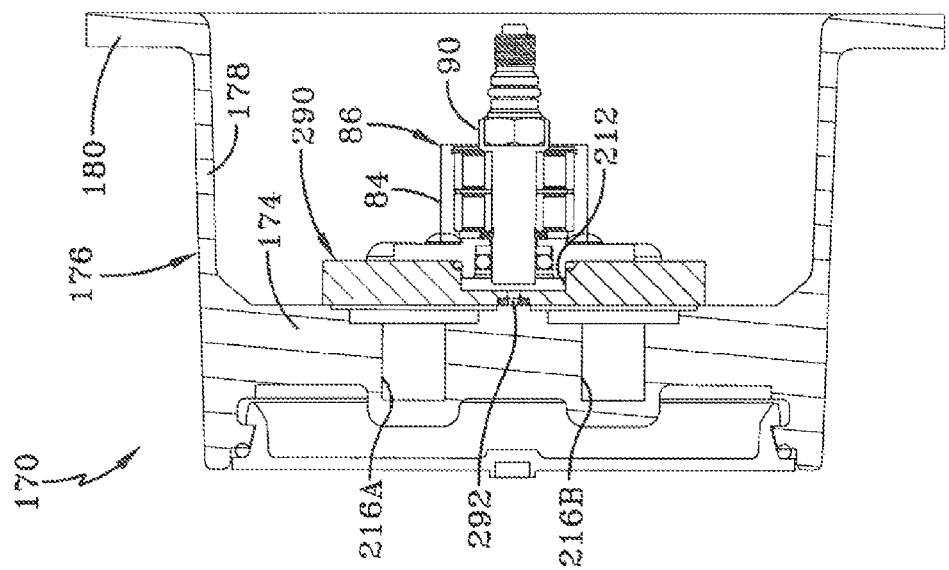
FIG. 14 is a cross-sectional elevational view of components of the second exemplary embodiment constant pressure pneumatic balancing tire inflation system of the present invention shown in FIG. 13.
Figure 13:
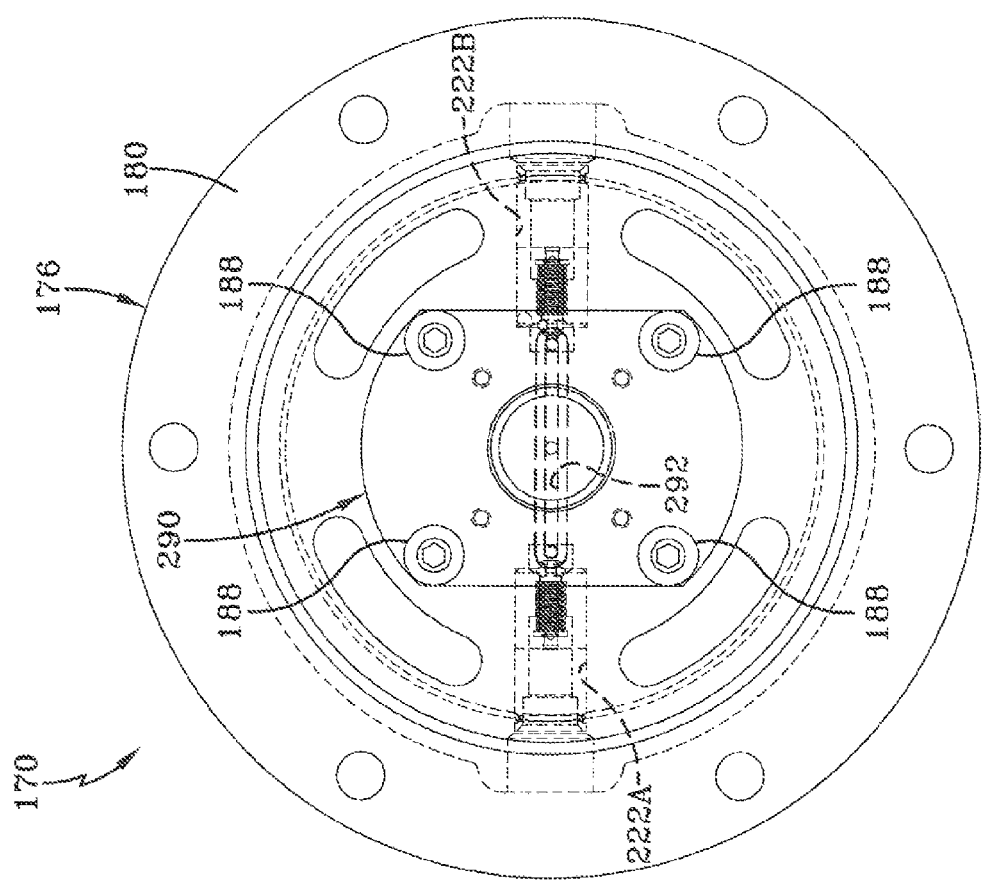
FIG. 13 is an inboard elevational view of components of the second exemplary embodiment constant pressure pneumatic balancing tire inflation system of the present invention, shown in an inflation-only configuration, with hidden portions represented by dashed lines.

Alternatively, as shown in FIGS. 13-14, second embodiment tire inflation system 170 may employ hub cap 176 and rotary union 86 without dual wheel valve 172 to provide tire inflation without deflation and pneumatic balancing. More particularly, an inflation plate 290 formed with a channel 292 may be used in place of pneumatic distribution plate 204 (FIG. 9), and wheel valves 148A, 148B are not included in respective housing chambers 216A, 216B. Channel 292 enables air to flow from supply cavity 212 to each respective housing chamber 216A, 216B, through cylindrical bores 222A, 222B, and through tire hoses 118A, 118B to the tires. In this inflation-only setup, the shape of poppet valve assembly 124 is configured so that it does not hold Schrader valve 134 open. As a result, air is able to flow from each respective housing chamber 216A, 216B through respective tire hoses 118A, 118B and into the tires, but is not able to flow back out of the tires. Because air is not able to flow from tires back through inflation plate 290 to supply cavity 212 in this configuration, tire inflation system 170 provides tire inflation without deflation or balancing.

Figure 16:
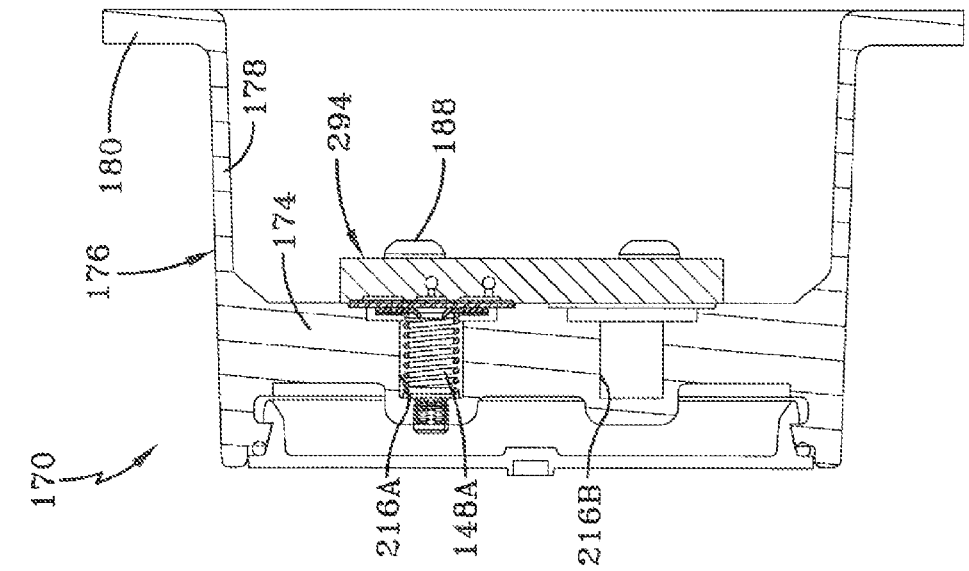
FIG. 16 is a cross-sectional elevational view of components of the second exemplary embodiment constant pressure pneumatic balancing tire inflation system of the present invention shown in FIG. 15.
Figure 15:
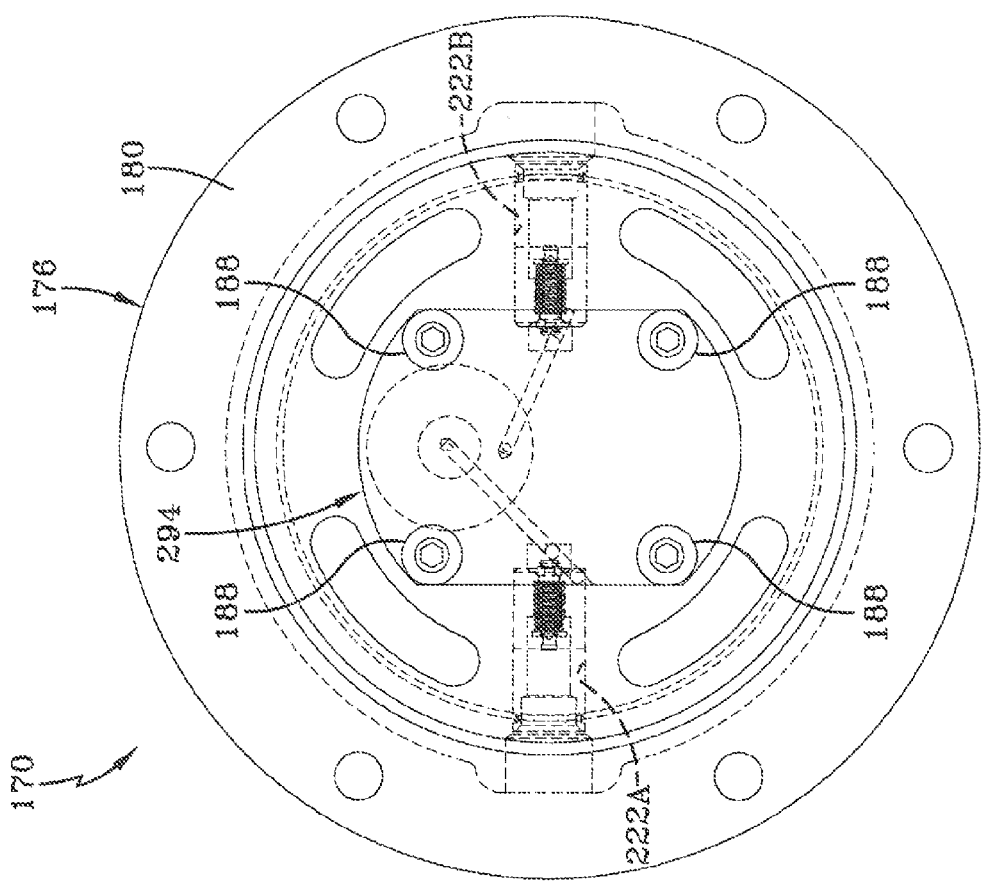
FIG. 15 is an inboard elevational view of components of the second exemplary embodiment constant pressure pneumatic balancing tire inflation system of the present invention, shown in a balancing-only configuration, with hidden portions represented by dashed lines.

As an additional alternative, as shown in FIGS. 15-16, second embodiment tire inflation system 170 may employ hub cap 176 and a single wheel valve 148A to enable fluid communication and pneumatic balancing between the tires independently of rotary union 86 and pneumatic conduit 96 (FIG. 5). More particularly, an inboard cover plate 294 may be used in place of pneumatic distribution plate 204 (FIG. 9). Hub cap 176 and wheel valve 148A enable fluid communication between the tires and enables them to have a generally uniform or balanced inflation pressure. More specifically, first tire hose 118A, first cylindrical bore 222A, first exit port 220A, first wheel valve exit port 218A, and first wheel valve 148A fluidly communicate with second wheel valve exit port 218B, second exit port 220B, second cylindrical bore 222B, and second tire hose 118B at supply openings 214 and supply cavity 212 along the fluid path provided from each respective wheel valve to the supply cavity by hub cap intermediate wall 174 and inboard cover plate 294. Because there is no fluid communication inboardly beyond inboard cover plate 294, wheel valve 148A provides pneumatic balancing between the tires independently of inflation and deflation.

The modular design of components of second embodiment tire inflation system 170 enable a standard or stock heavy-duty vehicle to easily convert between different configurations for the system, such as inflation, deflation and pneumatic balancing; inflation without deflation and pneumatic balancing; and pneumatic balancing independently of inflation and deflation. Second embodiment tire inflation system 170 enables such a conversion to be made quickly and easily using one hub cap 176 and simple inflation plate 290 and inboard cover plate 294, respectively.

Figure 17:
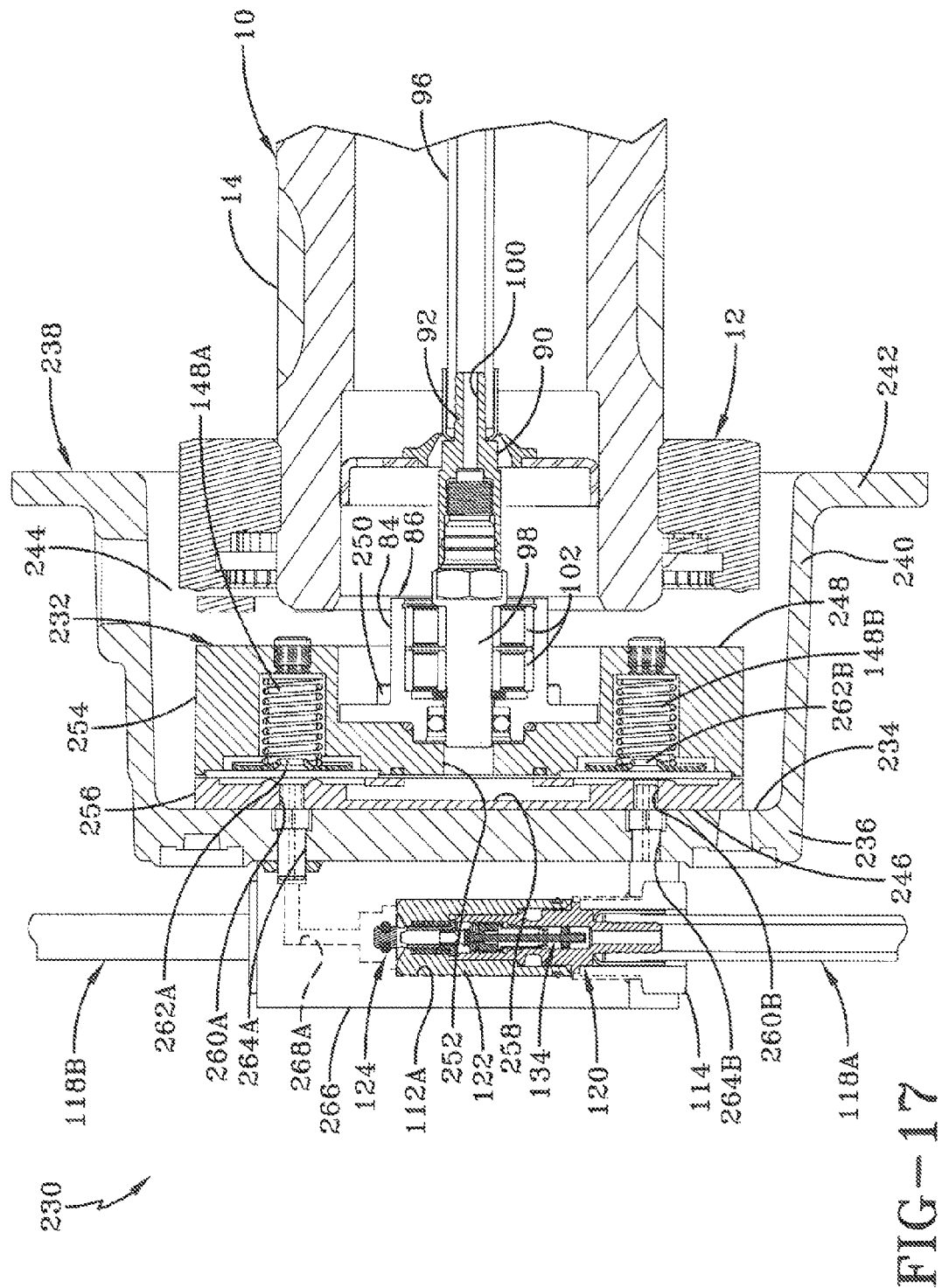
FIG. 17 is a fragmentary cross-sectional elevational view of components of a third exemplary embodiment constant pressure pneumatic balancing tire inflation system of the present invention, shown incorporated into an axle spindle.

Turning now to FIG. 17, a third exemplary embodiment of a constant pressure pneumatic balancing tire inflation system of the present invention is indicated generally at 230. Third exemplary embodiment tire inflation system 230 employs a discrete wheel valve assembly 232, shown by way of example as a dual wheel valve, mounted on an inboard surface 234 of an outboard wall 236 of a hub cap 238, as will be described in greater detail below. Mounting dual wheel valve 232 on inboard surface 234 of hub cap outboard wall 236 protects the wheel valve from environmental impact and environmental contamination. It is to be understood that tire inflation system 230 includes an air source, such as an air tank (not shown), which is in fluid communication with the vehicle tires (not shown) via a pneumatic conduit 96 and other components, which will be described in detail below. It is also to be understood that means known to those skilled in the art, such as mechanically-operated regulator valves (not shown), are fluidly connected to pneumatic conduit 96 and are employed to monitor the pneumatic pressure in the tires and to actuate inflation and/or deflation of the tires.

Hub cap 238 of second exemplary embodiment tire inflation system 230 includes a cylindrical side wall 240, and outboard wall 236 is integrally formed with the outboard-end of the side wall and extends generally perpendicular to the side wall. It is to be understood that other shapes and configurations of hub cap side wall 240 and outboard wall 236 may be employed without affecting the overall concept or operation of the present invention, such as an integrated dome or cone shape formed as one piece or multiple pieces. A radially-extending flange 242 is formed on the inboard end of side wall 240, and is formed with a plurality of bolt openings (not shown) to enable bolts to secure hub cap 238 to the outboard end of wheel hub 22 (FIG. 1). In this manner, hub cap 238 defines an interior compartment 244. It is to be understood that means known to those skilled in the art other than bolts may be used to secure hub cap 238 to wheel hub 22, such as a threaded connection between the hub cap and wheel hub, other types of mechanical fasteners, and/or a press fit.

Dual wheel valve 232 is integrated or directly attached to hub cap 238 in hub cap interior compartment 244. More particularly, dual wheel valve 232 includes an outboard surface 246 that is disposed against inboard surface 234 of hub cap outboard wall 236, and an inboard surface 248 that is disposed against rotary union 86. Preferably, bolts 250 or other mechanical fasteners secure cylindrical housing 84 of rotary union 86 to dual wheel valve 232, and also secure the dual wheel valve to inboard surface 234 of hub cap outboard wall 236. The construction of rotary union 86 is similar to that as described above for first embodiment tire inflation system 70, including a stem 90 having inboard portion 92 that engages pneumatic conduit 96 and outboard portion 98 that is rotatably mounted in rotary union housing 84 via bearings 102.

By way of example, to inflate the vehicle tires, air passes from pneumatic conduit 96 through central bore 100 formed in rotary union stem 90 to a fluid passage 252 formed in a body 254 of dual wheel valve 232. Dual wheel valve 232 includes a distribution plate 256 at wheel valve outboard surface 246. Air flows through fluid passage 252 in dual wheel valve 232 into a central passage 258 formed in distribution plate 256, and the distribution plate divides the air flow into two separate paths, so that air flows through exit ports 260A, 260B formed in the distribution plate, and into each respective wheel valve 148A, 148B.

Each wheel valve 148A, 148B is similar to that as described above for first embodiment tire inflation system 70. More particularly, each wheel valve 148A, 148B preferably is a diaphragm valve that remains open during all normal operating conditions, and is also capable of isolating each tire in tire inflation system 230 from one or more tires that experience a significant pressure loss, such as if a tire is punctured. Each wheel valve 148A, 148B is also capable of isolating each tire from the other components of tire inflation system 230 if the system develops a leak that exceeds the inflation capacity of the system. That is, each wheel valve 148A, 148B preferably is spring biased and actuates or opens at a selected pressure setting or pressure level, which is below or less than the minimum pressure that would be expected to be utilized as a target tire pressure.

For example, wheel valve 148A, 148B may open or actuate at a reasonable predetermined pressure level that is lower than the target inflation pressure, such as at about 70 pounds per square inch (psi) when the target inflation pressure is at about 90 psi. Alternatively, wheel valve 148A, 148B may open or actuate at a pressure level that is a set reasonable amount less than the target inflation pressure, such as a value of about 20% less than the target inflation pressure, or a value of about 20-30 psi less than the target inflation pressure. In this manner, each wheel valve 148A, 148B remains open during all normal operating conditions, thereby enabling air to flow to the tires, and also enabling fluid communication between the tires for balancing of pneumatic pressure, as will be described in greater detail below.

In the event of a significant pressure loss in one of the tires or in the pneumatic components of tire inflation system 230 that allows the pressure level in pneumatic conduit 96 to fall below the selected pressure setting, the spring bias of wheel valves 148A, 148B causes them to close, thus isolating each tire from the rest of the tire inflation system. For example, if the opening or actuation pressure level of wheel valve 148A, 148B is 70 psi and the pressure in pneumatic conduit 96 drops below 70 psi, each wheel valve closes and thus isolates the tires. Actuation of each wheel valve 148A, 148B at a reasonable pressure level below the target inflation pressure prevents excessive deflation of the tires and thereby provides emergency protection, in contrast to wheel valves of the prior art. More particularly, prior art wheel valves open at an extremely low pressure level, such as about 10-20 psi. As a result, in the event that one or more tires experience a significant pressure loss or system 230 develops a leak that exceeds the inflation capacity of the system, the prior art wheel valves remain open until the system pressure drops to 10-20 psi, which in turn allows significant undesirable deflation of the tires.

In addition, each wheel valve 148A, 148B provides means to enable the isolation of the tires from the vehicle supply tank by being able to be rapidly and/or reliably closed when the vehicle is parked for an extended period of time. As described above, each wheel valve 148A, 148B is able to respond to the engagement of the vehicle parking brake, or to other conditions that indicate the vehicle has been parked. In this manner, if there is a drop in the supply tank pressure while the vehicle is parked, the isolation of the tires that is enabled by wheel valves 148A, 148B prevents that drop from reducing the tire pressure.

When each wheel valve 148A, 148B is open, air flows from each respective wheel valve through a respective wheel valve exit port 262A, 262B, and through respective ports 264A, 264B formed in hub cap outboard wall 236 to a manifold block 266 that is mounted on outboard surface 246 of the hub cap outboard wall. Manifold block 266 is formed with respective channels 268A, 268B (only 268A shown) which fluidly communicate with each respective port 264A, 264B formed in hub cap outboard wall 236. Channels 268A, 268B formed in manifold block 266, in turn, are fluidly connected to each respective tire hose 118A, 118B. Optionally, ports 264A, 264B formed in hub cap outboard wall 236 may fluidly communicate with respective cylindrical bores 112A, 112B formed in manifold block 266. Cylindrical bores 112A, 112B are fluidly connected to each respective tire hose 118A, 118B, including coupling 114, hose fitting 120, and Schrader valve 134 of each tire hose, and associated poppet valve assemblies 124, as described above for first embodiment tire inflation system 70. Preferably, tire hoses 118A, 118B are configured according to a non-axial tire hose fitting system 270 (FIG. 18), which is described in greater detail below.

The structure of third embodiment tire inflation system 230 provides continuous balancing of pneumatic pressure across all of the tires in the system. More particularly, in a pneumatically balanced system 230, the tires are in fluid communication with one another, and according to the principles of fluid flow, all of the tires have a generally uniform, or balanced, inflation pressure. When this uniform inflation pressure is above the target pressure, the means that are employed to monitor the tire pressure enable tire inflation system 230 to decrease the uniform pressure by venting excess air to atmosphere as described above, which in turn decreases the inflation pressure of all of the tires in the system to the target pressure. When this uniform inflation pressure is below the target pressure, the means that are employed to monitor the tire pressure enable tire inflation system 230 to increase the uniform pressure by supplying air from a vehicle tank as described above, which in turn increases the inflation pressure of all of the tires in the system to the target pressure.

In addition, such fluid communication between all of the tires in tire inflation system 230 enables each pair of tires in a dual-wheel configuration to have the same pressure level and thus the same actual diameter, which reduces or eliminates the chance that one of the tires will experience scrubbing, which increases the life of the tires. Moreover, the fluid communication between all of the tires in tire inflation system 230 enables tires that are at the target pressure to contribute air to a tire with an excessively low inflation pressure, reducing the chance that a tire may operate with an excessively low inflation pressure.

The continuous balancing of pneumatic pressure of third embodiment tire inflation system 230 is provided by the unique manifolding path of hub cap 238 and dual wheel valve 232. More particularly, the manifolding path may be illustrated using inflation of the vehicle tires by way of example.

When the means that are employed to monitor the pneumatic pressure in the tires, as described above, determine that the pressure in the tires is below a desired level, the means actuate inflation of the tires. During inflation, air flows from the vehicle supply tank, through pneumatic conduit 96, through central bore 100 of rotary union stem 90 and into fluid passage 252 in dual wheel valve 232. Air flows through dual wheel valve fluid passage 252 and through central passage 258 in distribution plate 256, which divides the air flow into two separate paths. Air from each path flows through distribution plate exit ports 260A, 260B, and into each respective wheel valve 148A, 148B. When each wheel valve 148A, 148B is open, air flows from each respective wheel valve through respective wheel valve exit ports 262A, 262B and through respective ports 264A, 264B formed in hub cap outboard wall 236 to channels 268A, 268B in manifold block 266, and into tire hoses 118A, 118B and respective tires. Under normal operating conditions, this manifolding air path remains open in third embodiment tire inflation system 230 to provide a constant-pressure system that continuously balances pneumatic pressure across all of the tires in the system during inflation.

More particularly, first tire hose 118A, first manifold block channel 268A, first hub cap outboard wall port 264A, first wheel valve exit port 262A, and first wheel valve 148A fluidly communicate with second wheel valve 148B, second wheel valve exit port 262B, second hub cap outboard wall port 264B, second manifold block channel 268B, and second tire hose 118B at the distribution plate central passage. This fluid path provides fluid communication between each tire in a dual-wheel configuration. In addition, the fluid path continues through fluid passage 252 in dual wheel valve 232, central bore 100 of rotary union stem 90, and through pneumatic conduit 96. Pneumatic conduit 96 is fluidly connected to the remainder of the tires in the system, and thus enables fluid communication between all of the tires in tire inflation system 230. Such fluid communication between the tires enables them to have a generally uniform, or balanced, inflation pressure.

When the means that are employed to monitor the pneumatic pressure in the tires, as described above, determine that the pressure in the tires is above a desired level, the means actuate deflation of the tires. Typically in deflation, air is removed from the system via pneumatic conduit 96 and vented to atmosphere. The manifolding air path remains open in third embodiment tire inflation system 230 during deflation. More specifically, when each tire hose 118A, 118B is connected to hub cap 238, air flows from the tires through manifold block 266, through channels 268A, 268B in the manifold block, through respective ports 264A, 264B formed in hub cap outboard wall 236, through wheel valve exit ports 262A, 262B in distribution plate 256 and into each respective wheel valve 148A, 148B.

As described above, each wheel valve 148A, 148B preferably is spring biased and actuates or opens at a selected pressure level that is below the minimum pressure that would be expected to be utilized as a target tire pressure. As long as the pressure in pneumatic conduit 96 is above this selected pressure level, each wheel valve 148A, 148B remains open, thereby enabling air to flow through each wheel valve. Air then flows from each respective wheel valve 148A, 148B through distribution plate exit ports 260A, 260B, and through distribution plate 256 to distribution plate central passage 258.

It is at this point that fluid communication between the tires for continuous balancing of pneumatic pressure takes place. More particularly, first tire hose 118A, first manifold block channel 268A, first hub cap outboard wall port 264A, first wheel valve exit port 262A, and first wheel valve 148A fluidly communicate with second wheel valve 148B, second wheel valve exit port 262B, second huh cap outboard wall port 264B, second manifold block channel 268B, and second tire hose 118B at the distribution plate central passage. This fluid path provides fluid communication between each tire in a dual-wheel configuration. In addition, the fluid path continues through fluid passage 252 in dual wheel valve 232, central bore 100 of rotary union stem 90, and through pneumatic conduit 96. Pneumatic conduit 96 is fluidly connected to the remainder of the tires in the system, and thus enables fluid communication between all of the tires in tire inflation system 230. Such fluid communication between the tires enables them to have a generally uniform, or balanced, pressure when system 230 is in a deflation mode.

It is to be understood that the manifolding air path described above for third embodiment tire inflation system 230 provides fluid communication between all of the tires in the system during inflation and deflation, and when the system is not engaged in inflation or deflation. As a result, third embodiment tire inflation system 230 provides a constant-pressure system that continuously balances pneumatic pressure across all of the tires in the system.

In this manner, hub cap 238 provides a unique manifolding path that continuously balances pneumatic pressure between all of the tires in tire inflation system 230 under normal operating conditions, without any electronic components or controllers. In addition, third embodiment tire inflation system 230 compensates for ambient temperature changes, as the fluid communication between the tires provided by hub cap 238 enables increases in pneumatic pressure that are attributable to changes in ambient temperature to be relieved to atmosphere through a control valve assembly (not shown), which is fluidly connected to pneumatic conduit 96. The fluid communication between the tires provided by hub cap 238 also enables decreases in pneumatic pressure that are attributable to decreases in ambient temperature to be addressed through the introduction of air into pneumatic conduit 96, as described above.

Moreover, the unique manifolding path provided by hub cap 238 connects rotary union 86, dual wheel valve 232, and tire hoses 118A, 118B with no intermediate hoses or conduit. The elimination of intermediate hoses or conduit in turn reduces the cost and complexity of third embodiment tire inflation system 230 when compared to prior art tire inflation systems 40.

Dual wheel valve 232 of third embodiment tire inflation system 230 also provides emergency protection in the event a tire in the system experiences significant pressure loss, or if the components of the system develop a leak that exceeds the inflation capacity of the system. For example, if a specific tire is punctured or a pneumatic conduit ruptures, the pressure in pneumatic conduit 96 may drop. When the pneumatic pressure in pneumatic conduit 96 drops, the wheel valves 148A, 148B detect the pressure drop. As described above, when the pressure detected by wheel valves 148A, 148B drops below the selected actuation or opening pressure level for the valves, which is below the minimum pressure that would be expected to be utilized as a target tire pressure, the valves close. Once wheel valves 148A, 148B close, air flow to and from respective tire hoses 118A, 118B and thus the respective tires is terminated, thereby isolating each tire from the remainder of tire inflation system 230.

Each wheel valve 148A, 148B also provides means to reduce the pressure loss in the tires when the vehicle has been parked for an extended period of time. More particularly, each wheel valve 148A, 148B is able to be rapidly and/or reliably closed when the vehicle is parked, thereby enabling isolation of the tires from the supply tank.

Dual wheel valve 232 of third embodiment tire inflation system 230 includes additional advantages. For example, by incorporating two separate wheel valves 148A, 148B into a single valve body 254, dual wheel valve 232 is able to supply air to multiple tires from a single pneumatic supply conduit 96, and in cooperation with hub cap 238, is able to balance air between those tires. Dual wheel valve 232 provides a convenient, compact unit, while also being able to monitor the pneumatic pressure in separate tires via separate wheel valves 148A, 148B. By being mounted directly to hub cap 238, dual wheel valve 232 eliminates external hoses or conduit, in turn reducing the cost and complexity of third embodiment tire inflation system 230 when compared to prior art tire inflation systems 40. In addition, by being a discrete unit, dual wheel valve 232 may be built or constructed separately from hub cap 238 and later mounted on the hub cap, thereby providing more economical manufacturing.

By being mounted in hub cap interior compartment 244, dual wheel valve 232 is protected from environmental impact and environmental contamination. In addition, by being inside hub cap 238, dual wheel valve 232 includes a protected vent path for each wheel valve 148A, 148B, enabling each wheel valve housing chamber to open directly into hub cap interior compartment 244 and vent through axle 10, which reduces the introduction of environmental contaminants into the wheel valves. Mounting dual wheel valve 232 in hub cap interior compartment 244 also enables each wheel valve 148A, 148B to be disposed in a tamper-resistant location, thereby preventing unauthorized adjustment of the wheel valve pressure settings.

Figure 18:
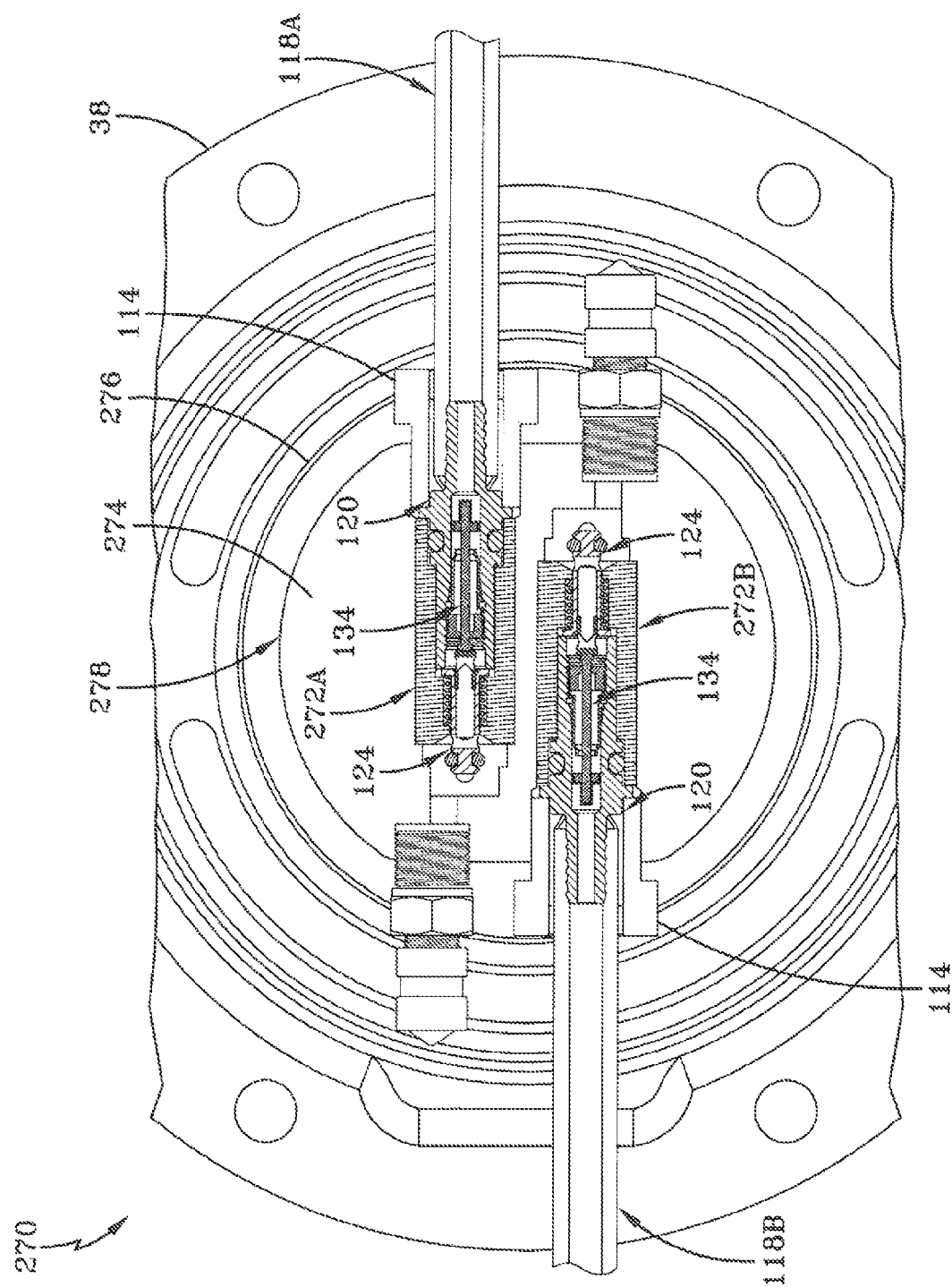
FIG. 18 is a fragmentary elevational view, partially in section, of an optional hose fitting system for use with and shown mounted on a constant pressure pneumatic balancing tire inflation system of the present invention.

Turning now to FIG. 18, an optional feature for use with first, second and third embodiment tire inflation systems 70, 170, 230, respectively, is shown. More particularly, a non-axial tire hose fitting system is indicated generally at 270. Non-axial tire hose fitting system 270 includes hose fittings 272A, 272B which are mounted either on an outboard surface 274 of an outboard wall 276 of a hub cap 278, or on a manifold block 266 (FIG. 17), which in turn is mounted to the hub cap outboard wall, or to a hub cap intermediate wall 174 (FIG. 7). Hose fittings 272A, 272B are located generally non-axially or side-by-side, rather than end-to-end along the same axis, to reduce the overall size of system 270. Locating hose fittings 272A, 272B generally side-by-side is useful when limited space is available on hub cap 278 due to other components that are mounted on the hub cap. In addition, by providing a reduced size, non-axial tire hose fitting system 270 desirably enables hub cap 278 to be of a more compact and smaller design than prior art hub cap 24 (FIG. 1).

In this manner, tire inflation system 70, 170, 230 of the present invention provides a tire inflation system that is a pneumatically-controlled, constant-pressure system which is capable of deflation, continuously balances pneumatic pressure across all of the tires in the system, and provides emergency protection in the event that one or more tires in the system experiences significant pressure loss. More particularly, tire inflation system 70, 170, 230 preferably includes hub cap 72, 176, 238, respectively, which acts as a manifold and cooperates with a wheel valve assembly 144, 172, 232, respectively, each shown by way of example as a dual wheel valve, that is integrated into or attached to each respective hub cap. Dual wheel valve 144, 172, 232 of tire inflation system 70, 170, 230, respectively, includes a construction that enables control of pneumatic pressure of a dual-wheel configuration of a heavy-duty vehicle. Tire inflation system 70, 170, 230 also optionally includes non-axial tire hose fitting 270.

Tire inflation system of the present invention 70, 170, 230 preferably employs mechanical components that are mechanically and/or pneumatically actuated, rather than electronically-operated solenoid valves, electronic controllers, and other electronic components, which are expensive and often complex to install and configure. As a result, tire inflation system 70, 170, 230 is simple, economical and easy to install. In addition, by being a mechanically and pneumatically actuated system, tire inflation system of the present invention 70, 170, 230 is reliable, since it does not require the use of the electrical system of the trailer, which may be unreliable or even non-functional at times.

Moreover, by not exhausting when inflation of the tires is complete, tire inflation system of the present invention 70, 170, 230 is a constant-pressure system. Such a constant-pressure system 70, 170, 230 does not require expensive and complex electronic controls to determine when it is necessary to trigger or commence inflation, instead employing mechanical components that are mechanically and/or pneumatically actuated. For this additional reason, tire inflation system 70, 170, 230 is simple, economical and easy to install, and by not employing electrical components, does not require the use of the electrical system of the trailer and thus is relatively reliable. In addition, as a constant-pressure system, tire inflation system 70, 170, 230 remains continuously charged with air, which enables the system to continuously monitor tire pressure and dynamically respond to pressure changes, and thereby actively or quickly respond to reduced tire pressure conditions, such as in the case of an air leak, and to increased tire pressure conditions, such as an increase in ambient temperature.

Tire inflation system of the present invention 70, 170, 230 provides continuous balancing of pneumatic pressure across all of the tires in the system. Because the structure of tire inflation system 70, 170, 230 enables the tires to be in fluid communication with one another, all of the tires have a generally uniform, or balanced, inflation pressure. Such fluid communication between all of the tires in tire inflation system 70, 170, 230 enables each pair of tires in a dual-wheel configuration to have the same pressure level and thus the same actual diameter, which reduces or eliminates the chance that one of the tires will experience scrubbing, which increases the life of the tires. Moreover, the fluid communication between all of the tires in tire inflation system 70, 170, 230 enables tires that are at the target pressure to contribute air to a tire with an excessively low inflation pressure, reducing the chance that a tire may operate with an excessively low inflation pressure.

Tire inflation system of the present invention 70, 170, 230 also provides emergency protection of the tires in the event that one tire experiences a significant pressure loss. Thus, if a tire is punctured or the components of the system develop a leak that exceeds the inflation capacity of the system, tire inflation system 70, 170, 230 isolates each tire from the rest of the system, thereby avoiding a significant decrease of the uniform inflation pressure of all of the tires. Tire inflation system 70, 170, 230 also provides means to reduce the pressure loss in the tires when the vehicle has been parked for an extended period of time by enabling isolation of the tires from the supply tank.

The present invention also includes a method of continuously balancing the pneumatic pressure across all of the tires in a constant pressure tire inflation system, and a method of providing emergency protection in the event a tire in the system experiences significant pressure loss. Each method includes steps in accordance with the description that is presented above and shown in FIGS. 2-18.

It is to be understood that the structure of the above-described constant pressure pneumatic balancing tire inflation system may be altered or rearranged, or certain components omitted or added, without affecting the overall concept or operation of the invention. For example, wheel valves 148A, 148B may be piston-style wheel valves, rather than the above-described diaphragm valves. In addition, other shapes and configurations of the walls of hub cap 72, 176, 238, such as an integrated dome or cone shape formed as one piece or multiple pieces, may be employed without affecting the overall concept or operation of the invention. Moreover, tire inflation system 70, 170, 230 may employ wheel valves 148A, 148B that are not mounted on or connected to a huh cap without affecting the overall concept or operation of the invention.

It is to be further understood that the present invention finds application in types of tire inflation systems for heavy-duty vehicles other than those shown and described herein and which are known to those skilled in the art, without affecting the concept or operation of the invention. Moreover, reference herein has been made to a constant pressure tire inflation system, and such reference includes all tire inflation systems with regulated pressure. For example, constant pressure systems include systems in which all or a significant portion of the pneumatic conduit of the system remains pressurized or charged with compressed air when the system is not engaged in inflation or deflation, and systems in which such pressurization of the pneumatic conduit may be interrupted by a switch or other component. Moreover, gases other than air that may be compressed and follow the principles of fluid flow, including nitrogen, carbon dioxide, and the like, may be employed without affecting the concept or operation of the invention.

While reference herein has been made generally to a heavy-duty vehicle for the purpose of convenience, it has been with the understanding that such reference includes trucks, tractor-trailers and semi-trailers, and trailers thereof. In addition, while axle 10 has been shown by way of example as a non-drive axle, the present invention applies to all types of axles known in the art, including drive axles and non-drive axles.

Accordingly, the improved constant pressure pneumatic balancing tire inflation system is simplified, provides an effective, safe, inexpensive, and efficient structure which achieves all the enumerated objectives, provides for eliminating difficulties encountered with prior art tire inflation systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved constant pressure pneumatic balancing tire inflation system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A constant pressure vehicle tire inflation system, comprising:
   an air supply source;
   a first wheel valve being in fluid communication with a first tire of said vehicle;
   a second wheel valve being in fluid communication with a second tire of said vehicle;
   a pneumatic conduit extending between and being in fluid communication with said air supply source and said wheel valves, at least a portion of said pneumatic conduit remaining charged with air from at least one of said supply source and said tires; and
   means for distributing air flow between said pneumatic conduit and said first and second wheel valves, whereby the wheel valves and said means selectively maintain fluid communication and flow between said first and second tires and the pneumatic conduit to provide pneumatic balancing between the first and second tires.

2. The constant pressure vehicle tire inflation system of claim 1, wherein said wheel valves and said means selectively maintain fluid communication between all of the tires that are fluidly connected to said system and provide pneumatic balancing between all of said tires.

3. The constant pressure vehicle tire inflation system of claim 1, wherein said system does not employ electronic components.

4. The constant pressure vehicle tire inflation system of claim 1, wherein said wheel valves are operatively attached to a hub cap of said vehicle, said hub cap including:
   a generally cylindrical sidewall;

an outboard wall extending generally perpendicular to said sidewall at a first end of said hub cap; and a flange extending radially outwardly from said sidewall at a second end of said hub cap.

5. The constant pressure vehicle tire inflation system of claim 4, wherein said wheel valves are attached to an outboard surface of said outboard wall of said hub cap.

6. The constant pressure vehicle tire inflation system of claim 4, wherein said wheel valves are attached to an inboard surface of said outboard wall of said hub cap.

7. The constant pressure vehicle tire inflation system of claim 4, wherein said wheel valves are integrated into said outboard wall of said hub cap.

8. The constant pressure vehicle tire inflation system of claim 4, wherein said hub cap further comprises an intermediate wall disposed between said outboard wall and said flange.

9. The constant pressure vehicle tire inflation system of claim 8, wherein said wheel valves are attached to an outboard surface of said intermediate wall of said hub cap.

10. The constant pressure vehicle tire inflation system of claim 8, wherein said wheel valves are attached to an inboard surface of said intermediate wall of said hub cap.

11. The constant pressure vehicle tire inflation system of claim 8, wherein said wheel valves are integrated into said intermediate wall of said hub cap.

12. The constant pressure vehicle tire inflation system of claim 4, wherein said wheel valves are removable from said hub cap.

13. The constant pressure vehicle tire inflation system of claim 4, further comprising a rotary union, said rotary union being mounted on said hub cap in an interior compartment of the hub cap, the rotary union providing fluid communication from said pneumatic conduit to said wheel valves.

14. The constant pressure vehicle tire inflation system of claim 13, wherein said rotary union is mounted in a housing, said housing being operatively attached to an interior surface of said outboard wall and protruding inboardly from the wall into said hub cap interior compartment.

15. The constant pressure vehicle tire inflation system of claim 4, wherein said hub cap includes a first port to receive a tire hose of said first tire and a second port to receive a tire hose of said second tire.

16. The constant pressure vehicle tire inflation system of claim 15, further comprising a first poppet valve assembly disposed in said first port and a second poppet valve assembly disposed in said second port, whereby said poppet valve assemblies enable selective fluid communication between said wheel valves and said tire hoses.

17. The constant pressure vehicle tire inflation system of claim 4, further comprising a first fitting attached to said hub cap for receiving a tire hose of said first tire and a second fitting attached to the hub cap for receiving a tire hose of said second tire, wherein said first fitting and said second fitting are disposed non-axially on said hub cap.

18. The constant pressure vehicle tire inflation system of claim 4, wherein:

said hub cap further comprises an intermediate wall disposed between said outboard wall and said flange;

said system further comprises a rotary union, said rotary union being mounted on said hub cap in an interior compartment of the hub cap, the rotary union providing fluid communication from said pneumatic conduit to said wheel valves; and said rotary union is mounted in a housing, said housing being operatively attached to an interior surface of a selected one of said hub cap walls and protruding inboardly from said selected wall into said hub cap interior compartment.

19. The constant pressure vehicle tire inflation system of claim 1, wherein said wheel valves are incorporated into a single wheel valve assembly.

20. The constant pressure vehicle tire inflation system of claim 1, wherein said means includes a pneumatic distribution plate to distribute air flow between said wheel valves and said pneumatic conduit.

21. The constant pressure vehicle tire inflation system of claim 20, wherein said pneumatic distribution plate is mounted in said hubcap.

22. The constant pressure vehicle tire inflation system of claim 1, wherein said wheel valves are capable of said fluid communication between said first and second tires independently of said pneumatic conduit.

23. The constant pressure vehicle tire inflation system of claim 1, wherein said wheel valves are biased to close when a pressure in said pneumatic conduit decreases below a predetermined level.

24. The constant pressure vehicle tire inflation system of claim 1, wherein said system is capable of deflation of said tires.

25. The constant pressure vehicle tire inflation system of claim 1, further comprising a hubcap, and wherein said wheel valves are mounted in said hubcap.

26. A vehicle tire inflation system, comprising:

an air supply source;

a first wheel valve being in fluid communication with a first tire of said vehicle;

a second wheel valve being in fluid communication with a second tire of said vehicle;

a pneumatic conduit extending between and being in fluid communication with said air supply source and said wheel valves, at least a portion of said pneumatic conduit capable of being charged with air from at least one of said supply source and said tires; and means for distributing air flow between said pneumatic conduit and said first and second wheel valves, wherein said system does not employ electronic components, whereby the wheel valves and said means selectively maintain fluid communication and flow between said first and second tires and the pneumatic conduit to provide pneumatic balancing between the first and second tires.

* * * * *